US007369492B2

(12) United States Patent
Shimizu

(10) Patent No.: US 7,369,492 B2
(45) Date of Patent: May 6, 2008

(54) RADIO AREA NETWORK CONTROL SYSTEM AND A WIDE AREA RADIO AREA NETWORK CONTROL SYSTEM

(75) Inventor: Keiichi Shimizu, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 798 days.

(21) Appl. No.: 10/487,231

(22) PCT Filed: Mar. 13, 2002

(86) PCT No.: PCT/JP02/02348

§ 371 (c)(1),
(2), (4) Date: Feb. 26, 2004

(87) PCT Pub. No.: WO03/077587

PCT Pub. Date: Sep. 18, 2003

(65) Prior Publication Data

US 2004/0235481 A1 Nov. 25, 2004

(51) Int. Cl.
*G01R 31/08* (2006.01)
(52) U.S. Cl. .................. 370/230; 370/229; 370/395.2; 370/395.41; 455/450; 455/452.2; 709/250
(58) Field of Classification Search ................ 370/328, 370/278, 329, 341, 230, 395.2, 395.41; 455/440, 455/453, 436, 439, 452.1, 452.2, 450; 709/250
See application file for complete search history.

(56) References Cited

U.S. PATENT DOCUMENTS 5,678,178 A * 10/1997 Tahkokorpi .............. 455/452.1

(Continued)

FOREIGN PATENT DOCUMENTS

| CA | 2 325 287 | 6/2001 |
|----|-----------|--------|
| CA | 2 325 295 | 6/2001 |

(Continued)

OTHER PUBLICATIONS

3GPP TS 24.501 v3.6.0, 3rd Generation Partnership Project; Technical Specification Group Radio Access Newtowk; UTRAN Overall Description (Release 1999), pp. 9-13.

(Continued)

*Primary Examiner*—Duc M. Nguyen
*Assistant Examiner*—Dung Lam
(74) *Attorney, Agent, or Firm*—Oblon, Spivak, McClelland, Maier & Neustadt, P.C.

(57) ABSTRACT

Presuming a case of dividing a control plane of a base station controller (RNC) into an apparatus to control a cell resource and an apparatus to control each of mobile stations (MS), it is a problem to be solved to distribute a load on the mobile station controller by setting an additional mobile station controller due to an increase in subscribers. Cell control radio control servers (Cell control RCS) 7a, 7b are nodes to control common resources, e.g., radio common channel, cell spread code, electric power, etc., bound to a cell, mobile station control radio control servers (Serving RCS) 8a, 8b are nodes to control each of mobile stations (MS) 5, and movement control/location management of the mobile stations (MS) 5, radio individual channel control, etc. are performed. Cell control radio bearer server (Cell control RBS) 9a, 9b process traffic flowing on a radio common channel according to an instruction of the cell control radio control servers (Cell control RCS) 7a, 7b, and mobile station control radio bearer servers (Serving RBS) 10a, 10b process traffic flowing on the radio individual channel according to an instruction of the mobile station control radio control servers (Serving RCS) 8a, 8b.

22 Claims, 13 Drawing Sheets

< ARCHITECTURE FOR REALIZING DISTRIBUTED RNC >

U.S. PATENT DOCUMENTS

| | | | |
|---|---|---|---|
| 6,131,030 A | | 10/2000 | Schön et al. |
| 6,597,913 B2* | | 7/2003 | Natarajan ................. 455/452.1 |
| 6,738,625 B1* | | 5/2004 | Oom et al. .................. 455/453 |
| 6,968,192 B2* | | 11/2005 | Longoni ...................... 455/453 |
| 2001/0036829 A1 | | 11/2001 | Costa et al. |
| 2001/0046218 A1 | | 11/2001 | Sutha et al. |
| 2002/0052206 A1* | | 5/2002 | Longoni ...................... 455/453 |
| 2002/0097693 A1 | | 7/2002 | Roberts et al. |

FOREIGN PATENT DOCUMENTS

| | | |
|---|---|---|
| EP | 1 056 301 | 11/2000 |
| EP | 1 226 733 | 5/2001 |
| EP | 1 161 106 A2 | 12/2001 |
| EP | 1 180 866 A1 | 2/2002 |
| EP | 1 180 886 A1 | 2/2002 |
| JP | 2001-251658 | 9/2001 |
| WO | WO 00/11878 | 3/2000 |
| WO | WO 00/35226 | 6/2000 |

OTHER PUBLICATIONS

Mobil Wireless Internet Forum, OpenRAN Architecture in 3$^{rd}$ Generation Mobile Systems Technical Report MTR-007, Release v1.0.0(Jun. 12, 2001), pp. 50-53.

W-CDMA Method and System Architecture, W-CDMA Mobile Communication Method, with Partial English Translation.

Antti Toskala, et al., "IP based UTRAN Architecture", URL:http://www.3gpp.org/ftp/tsg_ran/TSG_RAN/TSGR_10/Docs/PDFs/RP-000712.pdf, XP-002200942, Dec. 6, 2000, pp. 1-8.

Etsi, "Universal Mobile Telecommunications System (UMTS); UTRAN Overall Description (3GPP TS 25.401 version 4.2.0 Release 4)", ETSI TS 125 401, XP-002410528, Sep. 30, 2001, Version 4.2.0, Release 4, pp. 1-39.

* cited by examiner

Fig. 6

| CONTENT OF PROCESSING | UNIT COST | NUMBER OF MOBILE STATIONS (MS) CONTROLLED | PROCESSING COST |
|---|---|---|---|
| VOICE | 3 | 2456 | 7368 |
| PACKET(E-Mail) | 1 | 5900 | 5900 |
| PACKET(Web Access) | 2 | 4567 | 9134 |
| PACKET(Streaming) | 3 | 376 | 1128 |
| PACKET(Voice) | 3 | 209 | 627 |
| | | | TOTAL COST 24157 |

<CALCULATION SYSTEM OF COST DEPENDING ON SERVICE>

RADIO AREA NETWORK CONTROL SYSTEM AND A WIDE AREA RADIO AREA NETWORK CONTROL SYSTEM

TECHNICAL FIELD

This invention relates to a control system of a radio area network.

BACKGROUND ART

As described on page 96 in "W-CDMA Mobile Communication System" (supervising editor Keiji Tachikawa, published by Maruzen Co., Ltd. on Jun. 25, 2001) standardized by 3GPP (3rd Generation Partnership Project) which is a standardization association of industry, a third generation mobile network to which W-CDMA (Wideband-Code Division Multiple Access) radio technique is applied includes a radio area network (called RAN) and a core network (called CN). The radio area network related to this invention is a network in which radio control and station movement control depending on W-CDMA (Wideband-Code Division Multiple Access) radio technique is performed.

FIG. 11 shows an architecture diagram of the radio area network. 1 denotes a packet switchboard belonging to the core network (CN), and 2 denotes a voice switchboard belonging to the core network (CN). 3a-3c denote base station controllers (RNC) belonging to the radio area network (RAN), 4a-4d denote base stations (NodeB) belonging to the radio area network (RAN). 5 denotes a mobile station (MS).

FIG. 12 outlines an operation when transmission is originated from the mobile station (MS) in the radio area network (RAN). When the mobile station (MS) 5 starts voice/packet communication, the mobile station (MS) 5 requests the base station controllers (RNC) 3a-c to allocate a radio signaling resource which is necessary for transmission of signaling at first. This request is sent to the base station controllers (RNC) 3a-c through the base stations (NodeB) 4a-d which terminate this channel using a radio common channel which can be used commonly by all of the mobile stations (MS) 5. By this request, the base station controllers (RNC) 3a-c allocate a radio individual channel used by the mobile station (MS) 5 for transmission of signaling, and notify the base stations (NodeB) 4a-d of radio individual channel information. In this way, resources, e.g., spread code, frequency, etc. is allocated to the mobile station (MS) 5. When the resources for the mobile station (MS) 5 in the base stations (NodeB) 4a-d have been secured, the base station controllers (RNC) 3a-c notify the mobile station (MS) 5 of this radio individual channel information. Accordingly, the radio signaling resource has been allocated.

After then, the mobile station (MS) 5 notifies the core network (CN) of a request to originate transmission of a packet or to originate transmission of voice using this radio signaling resource. By this request, the core network (CN) requests the base station controllers (RNC) 3a-c to allocate a radio call resource used for packet communication or voice call. By this request, the base station controllers (RNC) 3a-c determine to increase the radio individual channel used, and notify the base stations (NodeB) 4a-d of this. When the base stations (NodeB) 4a-d have added the resources for the mobile station (MS) 5 at the base stations (NodeB) 4a-d, the base station controllers (RNC) 3a-c notify the mobile station (MS) 5 of this radio individual channel information. Accordingly, the radio call resource has been allocated. Then, the mobile station (MS) 5 becomes able to perform the packet communication or voice call.

In FIG. 12, a flow concerning information for security and authentication sent and received between the mobile station (MS) and the radio area network (RAN)/core network (CN), a flow concerning various synchronization/timing control, and sending and receiving of various information between the mobile station (MS) and the core network (CN) are omitted as they are not directly related to this invention.

Further, concerning radio area network (RAN) architecture in the future, MWIF (Mobile Wireless Internet Forum) is proposing Open RAN Architecture (MTR007v1.0.0). Mapping of open radio area network (OPEN RAN) and 3GPP radio area network (3GPP RAN) described on page 52 of this document is illustrated in FIG. 13. In FIG. 13, the base station controllers (RNC) 3a-c are divided into two planes, i.e., bearer plane (Bearer Plane) for handling user traffic and control plane (Control Plane) for controlling the mobile station (MS) and the base station (NodeB). Further, each of them is split into a part for handling cell resources, described as CRNC/DRNC and a part for handling resources allocated to the mobile station (MS), described as SRNC. This architecture aims at optimally arranging many functions provided in the base station controller (RNC) in present condition, and suggests that there is a possibility to decompose and restructure the present architecture.

This invention intends to solve the problem in the open radio area network architecture with presumption that the open radio area network (RAN) will develop based on the open radio area network architecture (Open RAN Architecture) of MWIF. Particularly, in the open radio area network architecture, the control plane (Control Plane) of the base station controller (RNC) is divided into a part for controlling the cell resources and a part for controlling each of the mobile stations (MS), and each of the parts is provided additionally according to a number of cells or a number of the mobile stations (MS). This suggests that control of the base station controller (RNC) is distributed to functions of cell control and mobile station (MS) control, and also suggests that a load is distributed in each level of the cell control or the mobile station (MS) control. The open radio area network architecture describes this method to distribute functions, however does not regulate a load distributing system of each of the functions. It is a subject of this invention to provide the load distributing system which can be applied to this new area network architecture.

DISCLOSURE OF THE INVENTION

A radio area network control system according to this invention is a radio area network control system including a cell control radio control server with a function to control common resources concerning a cell among functions of a control plane of a base station controller belonging to a radio area network and a plurality of mobile station control radio control servers with a function to control each of mobile stations. The said plurality of mobile station control radio control servers respectively performs continuous transmission of usage condition of their own resources to the said cell control radio control server, the said cell control radio control server receives the said usage condition of the resources continuously, the said cell control radio control server selects an optimal mobile station control radio control server based on the said usage condition of the resources when the said cell control radio control server receives a request to allocate a radio signaling resource started from transmission originated in the said mobile station, and transfers the request to allocate the said radio signaling resource to the mobile station control radio control server selected.

The said plurality of mobile station control radio control servers performs cyclical transmission as the said continuous transmission.

The said plurality of mobile station control radio control servers performs the said continuous transmission together with transmission of a request to change a radio individual channel transferred to the said mobile station through the said cell control radio control server.

The said plurality of mobile station control radio control servers performs the said continuous transmission together with transmission of a request to change a radio individual channel transferred to the said mobile station through the said cell control radio control server.

The said plurality of mobile station control radio control servers performs the said continuous transmission when the said usage condition of the resources exceeds a determined threshold value.

The radio area network control system includes a plurality of cell control radio control servers corresponding to a common cell, and the said plurality of mobile station control radio control servers performs the said continuous transmission by IP (Internet Protocol) multicast communication to the said plurality of cell control radio control servers.

The said cell control radio control server reads out ID of the said mobile station, which is included in the received request to allocate the radio signaling resource started from the transmission originated in the said mobile station, and selects the said optimal mobile station control radio control server based on the ID of the said mobile station, which is read out, in addition to the said usage condition of the resources. The said mobile station control radio control server reads out the ID of the said mobile station, which is included in the said request to allocate the radio signaling resource, which is transferred, and discards the said request to allocate the radio signaling resource, which is transferred, when processing to allocate the radio signaling resource corresponding to the ID of the said mobile station, which is read out, has been performed.

The said mobile station control radio control server calculates a total cost based on a number of mobile stations controlled for each of services provided for the said mobile station, and a processing cost for each of the said services, and sends the said total cost calculated to the said cell control radio control server as the said usage condition of the resources.

The said cell control radio control server reads out ID of the said mobile station included in the received request to allocate the radio signaling resource started from the transmission originated in the said mobile station, specifies contract contents of a subscriber based on the ID of the said mobile station, which is read out, and selects the said optimal mobile station control radio control server based on the said contract contents specified in addition to the said usage condition of the resources.

A wide area radio area network control system according to this invention is a wide area radio area network control system including a plurality of radio area network control systems corresponding to a plurality of adjacent areas, including a cell control radio control server with a function to control common resources concerning a cell among functions of a control plane of a base station controller belonging to a radio area network and a plurality of mobile station control radio control servers with a function to control each of mobile stations. Each of the cell control radio control servers can communicate each other, and further always grasps usage condition of resources of the plurality of mobile station control radio control servers in each of the radio area network control systems. When the mobile station control radio control server determines to commit the control of the said mobile station to one of the mobile station control radio control servers in the radio area network corresponding to a destination area of movement as the mobile station using a radio individual channel moves, the mobile station control radio control server inquires a mobile station control radio control sever which can be used among the mobile station control radio control servers in the radio area network corresponding to the destination area of the movement of the cell control radio control server in the radio area network corresponding to a source area. The cell control radio control server in the radio area network corresponding to the source area transfers the said inquiry to the cell control radio control server in the radio area network corresponding to the destination area of the movement. The cell control radio control server in the radio area network corresponding to the destination area of the movement determines the mobile station control radio control server to be used based on the said usage condition of the resources, and sends back a notice of the mobile station control radio control server to be used to the mobile station control radio control server in the radio area network corresponding to the source area through the cell control radio control server in the radio area network corresponding to the source area. The mobile station control radio control server in the radio area network corresponding to the source area starts a procedure to commit the control of the said mobile station to the said mobile station control radio control server to be used based on the said notice received.

A wide area radio area network control system according to this invention is a wide area radio area network control system including a plurality of radio area network control systems corresponding to a plurality of adjacent areas, including a plurality of mobile station control radio control servers with a function to control each of mobile stations among functions of a control plane of a base station controller belonging to a radio area network and a switchboard belong to a core network. The said switchboard takes a count of a request to originate transmission of a packet or voice from each of the corresponding mobile station control radio control servers, and measures a load on each of the said mobile station control radio control servers based on the count. When the said mobile station control radio control server determines to commit the control of the said mobile station to one of the mobile station control radio control servers in the radio area network corresponding to a destination area of movement as the mobile station using a radio individual channel moves, the said mobile station control radio control server sends a request to change the mobile station control radio control server to the switchboard belonging to the core network corresponding to the destination area of the movement. The switchboard belonging to the core network corresponding to the destination area of the movement determines the mobile station control radio control server to be used based on the said load, and transfers the said request to the mobile station control radio control server determined.

A wide area radio area network control system according to this invention is a wide area radio area network control system including a plurality of radio area network control systems corresponding to a plurality of adjacent areas, including a cell control radio control server with a function to control common resources concerning a cell among functions of a control plane of a base station controller belonging to a radio area network and a plurality of mobile station control radio control servers with a function to control each of mobile stations. The cell control radio control server always grasps usage condition of resources of the said plurality of mobile station control radio control servers, and when the cell control radio control server receives a request to update a camp cell from a mobile station using a radio common channel, the cell control radio control server determines a mobile station control radio control server to be newly used based on the said usage condition of the resources, and transfers the request to update the said camp cell to the mobile station control radio control server to be newly used. The mobile station control radio control server to be newly used specifies the mobile station control radio control server which is controlling the said mobile station at present based on the received request to update the said camp cell, and transfers the request to update the said camp cell to the mobile station control radio control server which is controlling at present. The mobile station control radio control server which is controlling at present starts a procedure to commit the control of the said mobile station to the mobile station control radio control server to be used newly based on the request to update the said camp cell received.

BRIEF DESCRIPTION OF THE DRAWINGS

FIG. 6 is a total cost calculation table prepared for realizing Embodiment 6 of this invention.

BEST MODE FOR CARRYING OUT THE INVENTION

Embodiment 1.

Figure 1:
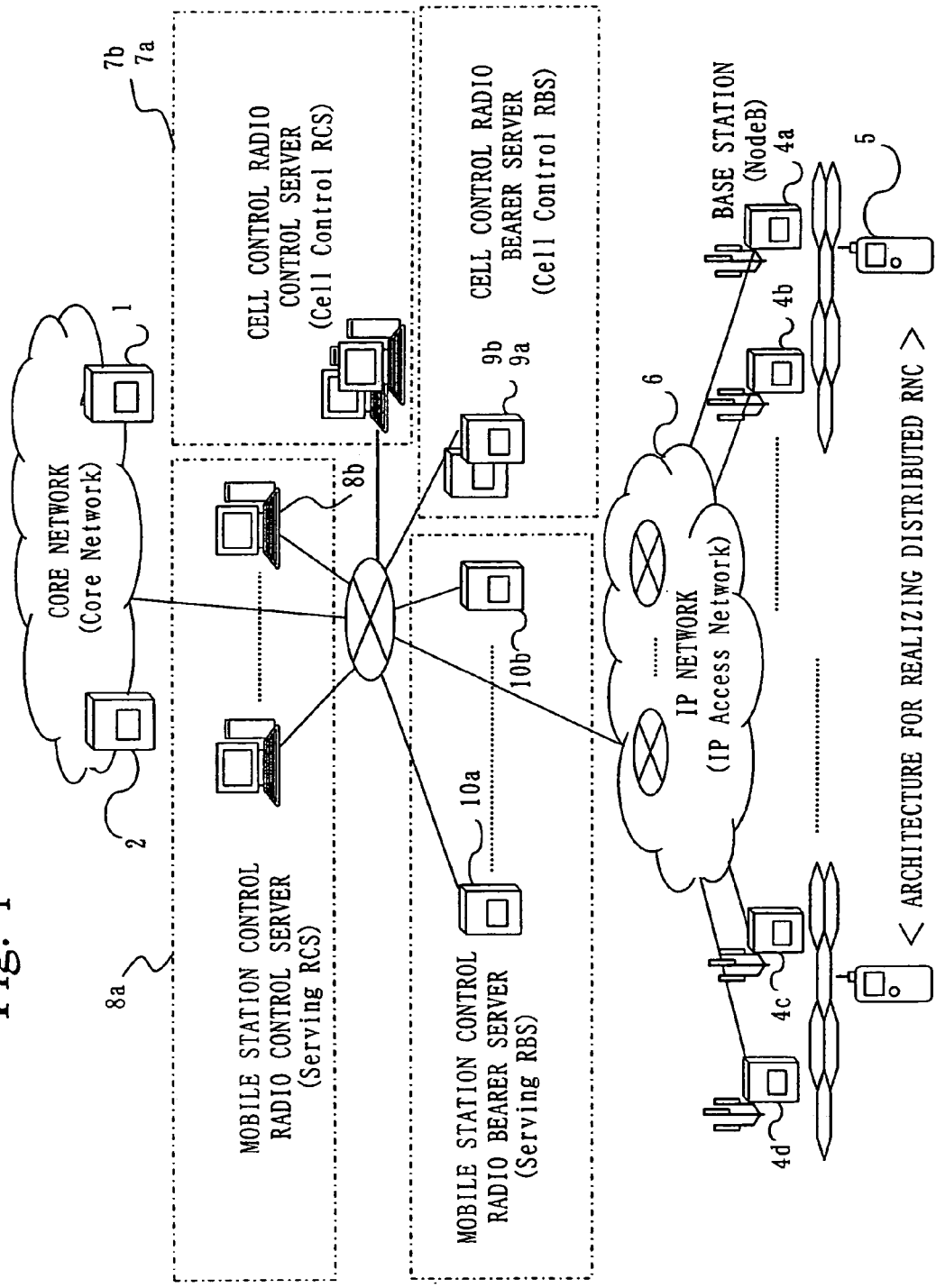
FIG. 1 is radio area network architecture presumed in Embodiment 1 of this invention.
Figure 11:
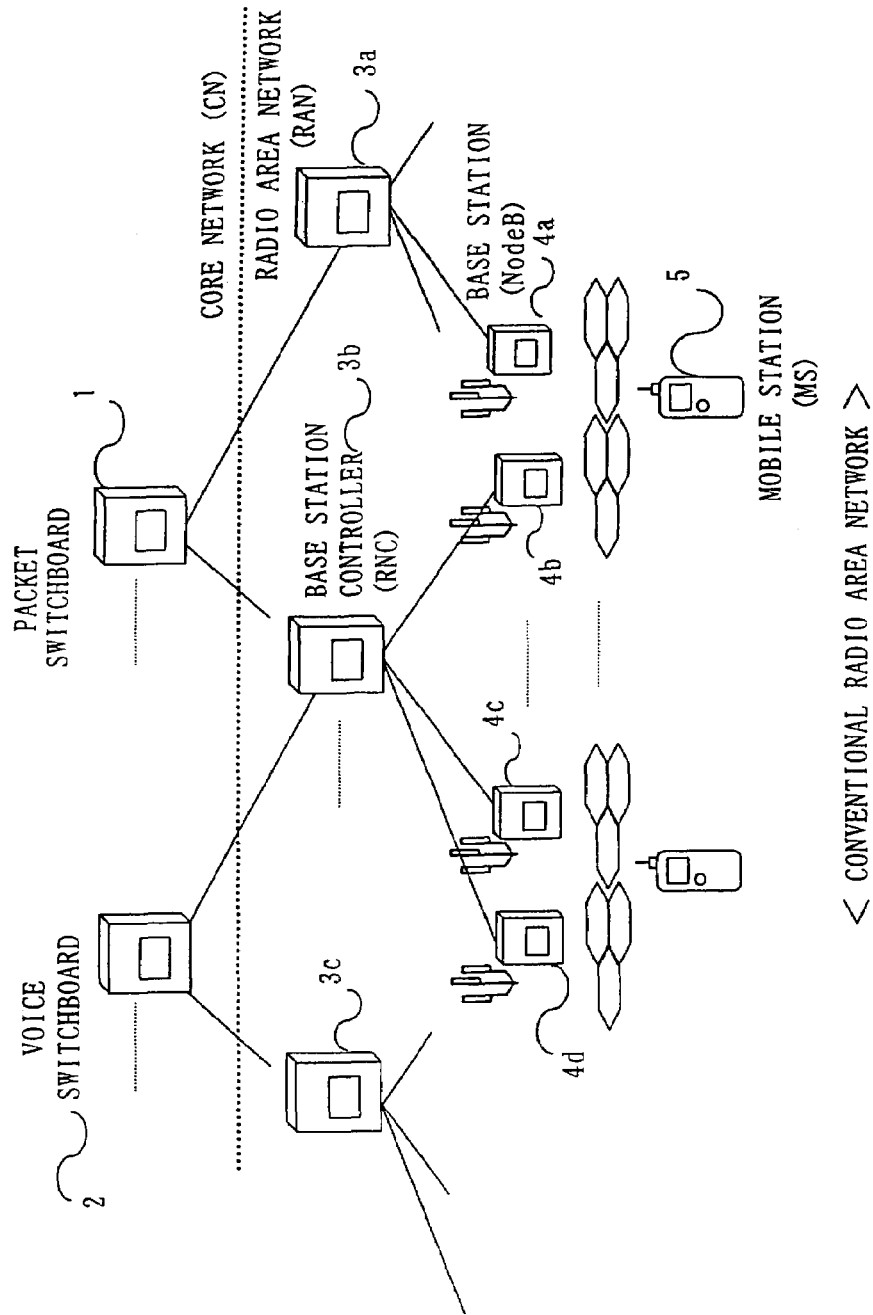
FIG. 11 illustrates a conventional radio area network.

FIG. 1 illustrates radio area network architecture in Embodiment 1. 6 denotes an IP network which functions as a backbone of various equipments in a radio area network (RAN), 7a and 7b denote cell control radio control servers (Cell Control RCS) belonging to a control plane (Control Plane), which control the cell resources, 8a and 8b denote mobile station control radio control servers (Serving RCS) belonging to the control plane (Control Plane), which perform control with respect to movement in a mobile station (MS) unit, radio individual channel, etc., 9a and 9b denote cell control radio bearer servers (Cell Control RBS) belonging to a bearer plane (Bearer Plane), which handle traffic of a common channel shared by a plurality of mobile stations (MS) 5, and 10a and 10b denote mobile station control radio bearer servers (Serving RBS) belonging to the bearer plane (Bearer Plane), which handle traffic of an individual channel occupied by a single mobile station (MS) 5. Others are same as FIG. 11.

The cell control radio control servers (Cell control RCS) 7a and 7b are nodes for controlling common resources, e.g., radio common channel, cell spread code, electric power, etc. bound to a cell, the mobile station control radio control servers (Serving RCS) 8a and 8b are nodes for controlling each of mobile stations (MS) 5, which perform movement control/location management of the mobile stations (MS) 5, radio individual channel control, etc. The cell control radio bearer server (Cell control RBS) 9a and 9b process traffic flowing on the radio common channel according to an instruction from the cell control radio control servers (Cell control RCS) 7a and 7b, and the mobile station control radio bearer servers (Serving RBS) 10a and 10b process traffic flowing on the radio individual channel according to an instruction from the mobile station control radio control servers (Serving RCS) 8a and 8b.

Figure 2:
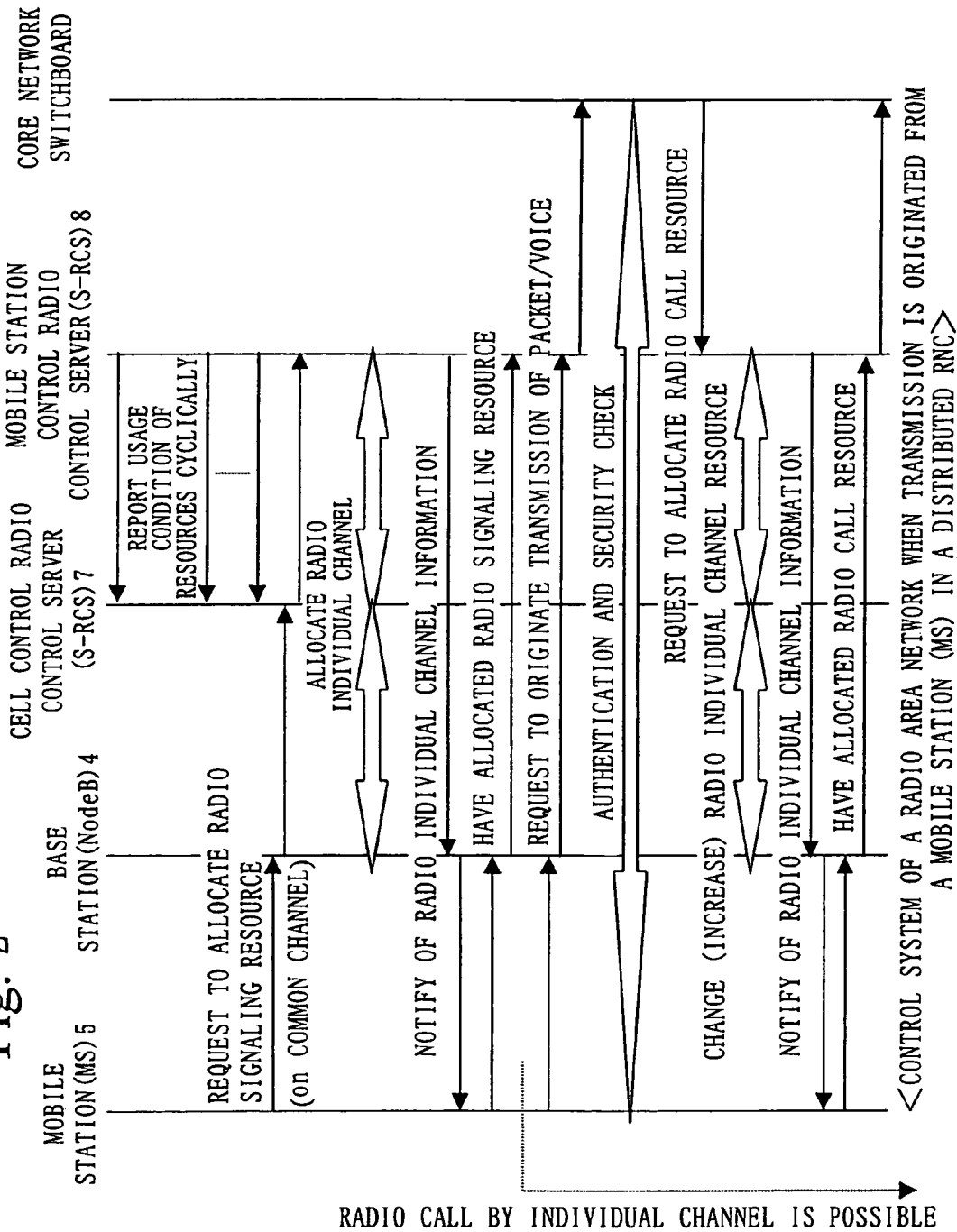
FIG. 2 is a flow of information of radio control when transmission is originated from a station related to Embodiment 1 of this invention.

Next, with reference to FIG. 2, operations are explained. At first, a plurality of mobile station control radio control servers (Serving RCS) 8 existing in the radio area network (RAN) reports usage condition of their own resources to the cell control radio control server (Cell control RCS) 7 cyclically. The usage condition of the resources here includes a CPU load, a number of mobile stations (MS) controlled, a number of buffers used, etc. By reporting continuously in this way, the cell control radio control server (Cell control RCS) 7 can always grasp a load on the plurality of mobile station control radio control servers (Serving RCS) 8. The mobile station (MS) 5 requests the radio area network (RAN) using the radio common channel to allocate the radio signaling resources as in FIG. 12. This request is sent to the cell control radio control server (Cell control RCS) 7 which controls cell/base station (NodeB) for terminating the common channel. The cell control radio control server (Cell control RCS) 7 selects one with the most opening in the resource among the plurality of mobile station control radio control servers (Serving RCS) 8, and transfers a request to allocate the radio signaling resources to this mobile station control radio control server (Serving RCS) 8. The mobile station control radio control server (Serving RCS) 8 determines a radio individual channel used by the mobile station (MS) for transmission of signaling by this request, and notifies the base station (NodeB) 4 through the cell control radio control server (Cell control RCS) 7. In this negotiation, resources, e.g., a spread code, a frequency number, etc. managed by the base station (NodeB) 4 are allocated to the mobile station (MS) 5. When the resources of the base station (NodeB) 4 for the mobile station (MS) 5 have been secured, the mobile station control radio control server (Serving RCS) 8 notifies the mobile station (MS) 5 of this radio individual channel information. In this way, the radio signaling resources have been allocated.

After then, a request to originate transmission of packet/voice by the mobile station (MS) 5 is processed among the mobile station (MS) 5, the mobile station control radio control server (Serving RCS) 8 and core network (CN), and the cell control radio control server (Cell control RCS) 7 is not involved in this processing.

Even though the mobile station control radio control server (Serving RCS) 8 is not illustrated in FIG. 2 as it is not directly related to this invention, the mobile station control radio control server (Serving RCS) 8 controls the mobile station control radio bearer servers (Serving RBS) 10*a* and 10*b* with timing of allocation/change of radio individual channel resources to the base station (NodeB), and sets the bearer plane (Bearer Plane).

Figure 12:
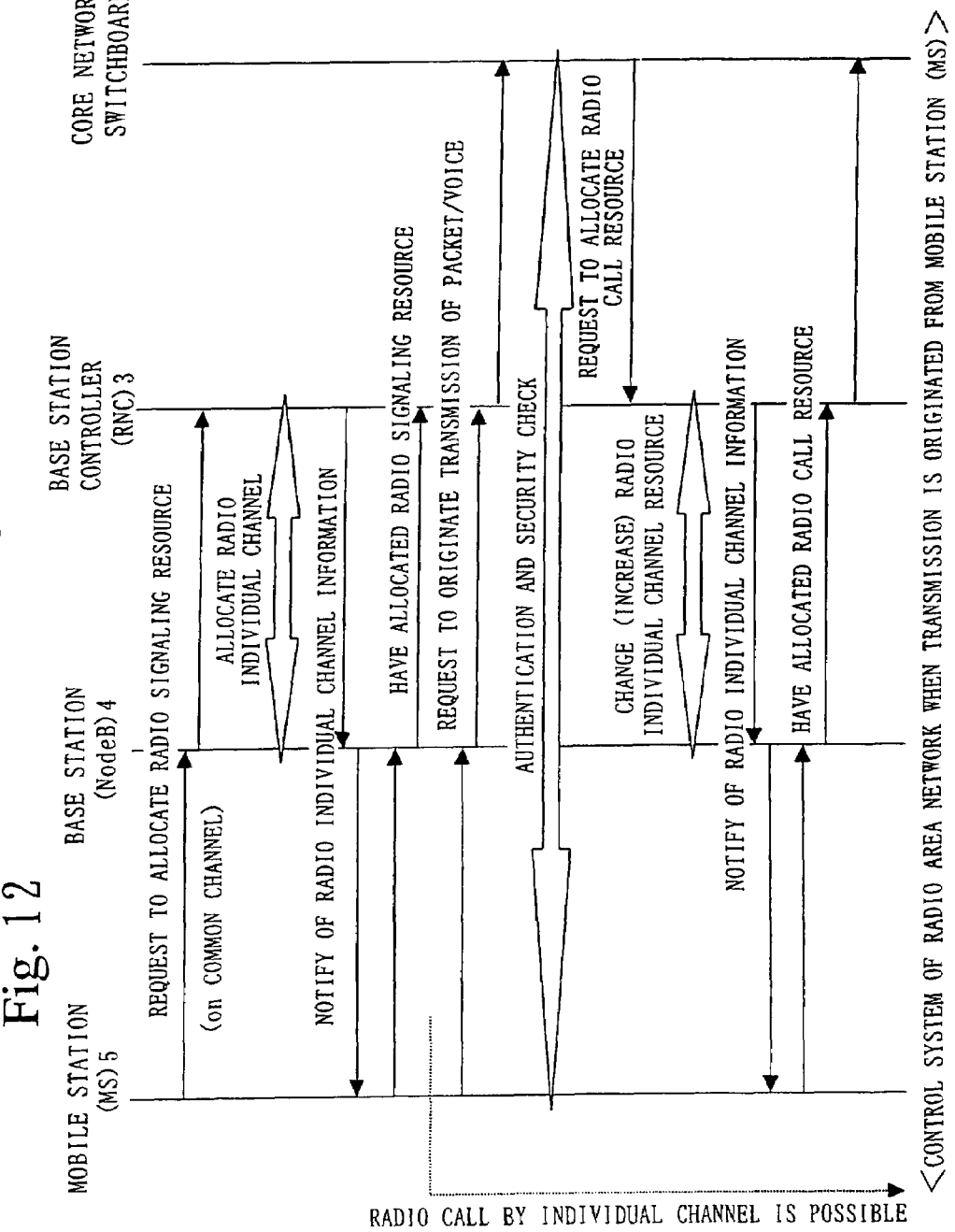
FIG. 12 is a flow of information to illustrate control in the radio area network when transmission is originated from a station in the conventional radio area network.
Figure 13:
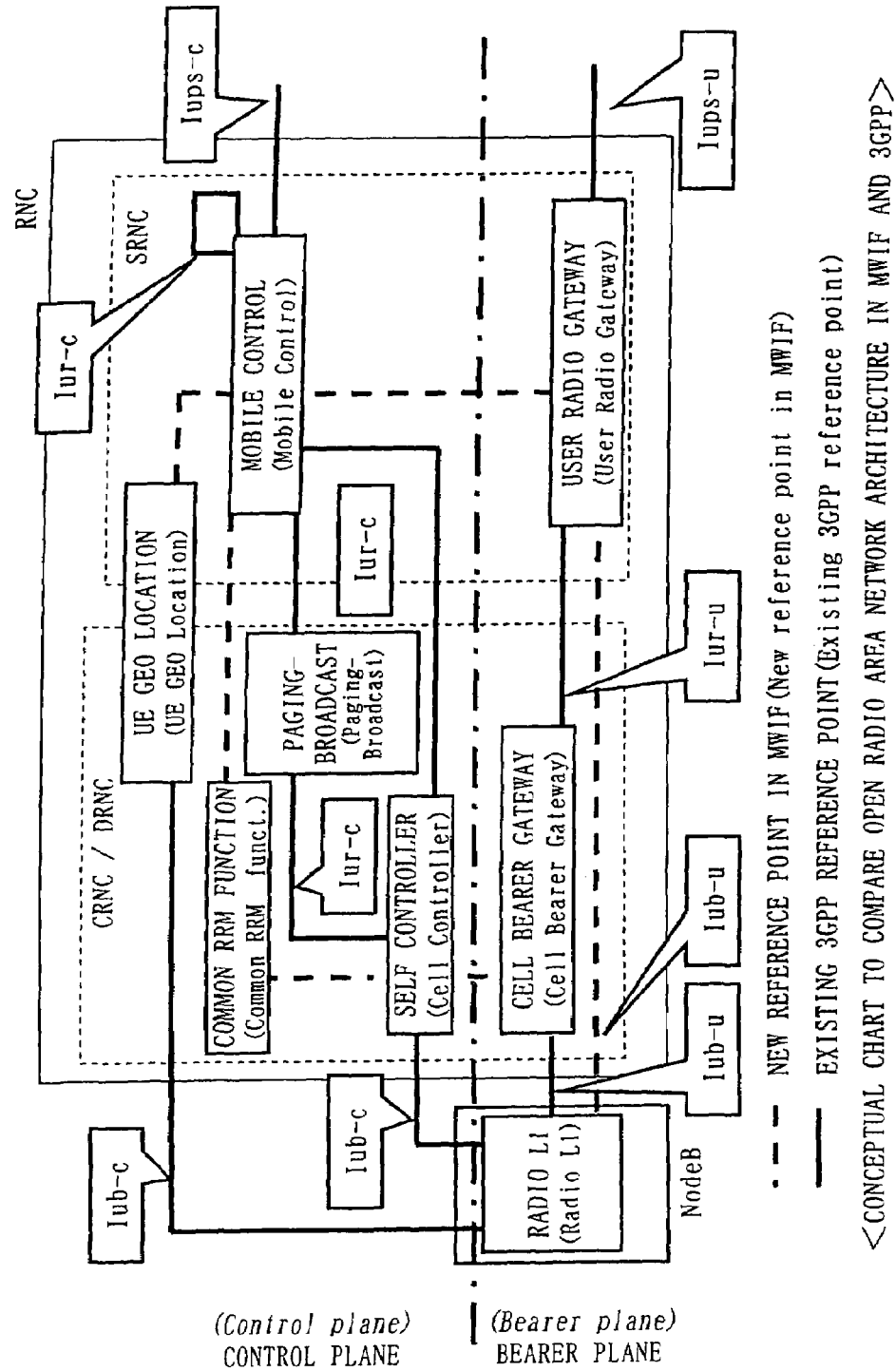
FIG. 13 shows a conceptual chart to compare open radio area network architecture and 3GPP architecture, described in Open RAN Architecture (MTR007v1.0.0) of MWIF.

Here, a comparison is made with the conventional technique. Since the request to allocate the radio signaling resources from the mobile station (MS) illustrated in FIG. 12 is transmitted on the radio common channel, the cell control radio control server (Cell control RCS) 7 receives, and the cell control radio control radio control server (Cell control RCS) 7 transfers to the mobile station control radio control server (Serving RCS) to request to control the mobile station (MS). After this, basically, the selected mobile station control radio control server (Serving RCS) 7 performs control of this mobile station (MS) regardless of movement of the mobile station (MS). However, control of allocation/change of the radio individual channel to the base station (NodeB) 4 illustrated in FIG. 12 is performed by requesting the cell control radio control server (Cell control RCS) 7 which controls the cell resources. Further, the mobile station control radio control server (Serving RCS) 8 selects a single mobile station control radio bearer server from a plurality of mobile station control radio bearer servers (Serving RBS) 10*a* and 10*b*, and utilizes it for processing user traffic sent to and received from the concerning mobile station (MS) 5. After this, the selected mobile station control radio bearer servers (Serving RBS) 10*a* and 10*b* perform traffic processing of this mobile station (MS) user regardless of the movement of the mobile station (MS) 5 basically.

As stated above, on the presumption that the plurality of mobile station control radio control servers (Serving RCS) 8 performs load distribution of control of mobile station (MS), each of the mobile station control radio control server (Serving RCS) 8 always reports usage condition of its own resources. The cell control radio control server (Cell Control RCS) 7 judges an optimal mobile station control radio control server (Serving RCS) 8 based on this information at time of receiving the request to allocate the radio signaling resources, and transfers the request to allocate the radio signaling resources to this mobile station control radio control server (Serving RCS) 8.

Embodiment 2.

Figure 3:
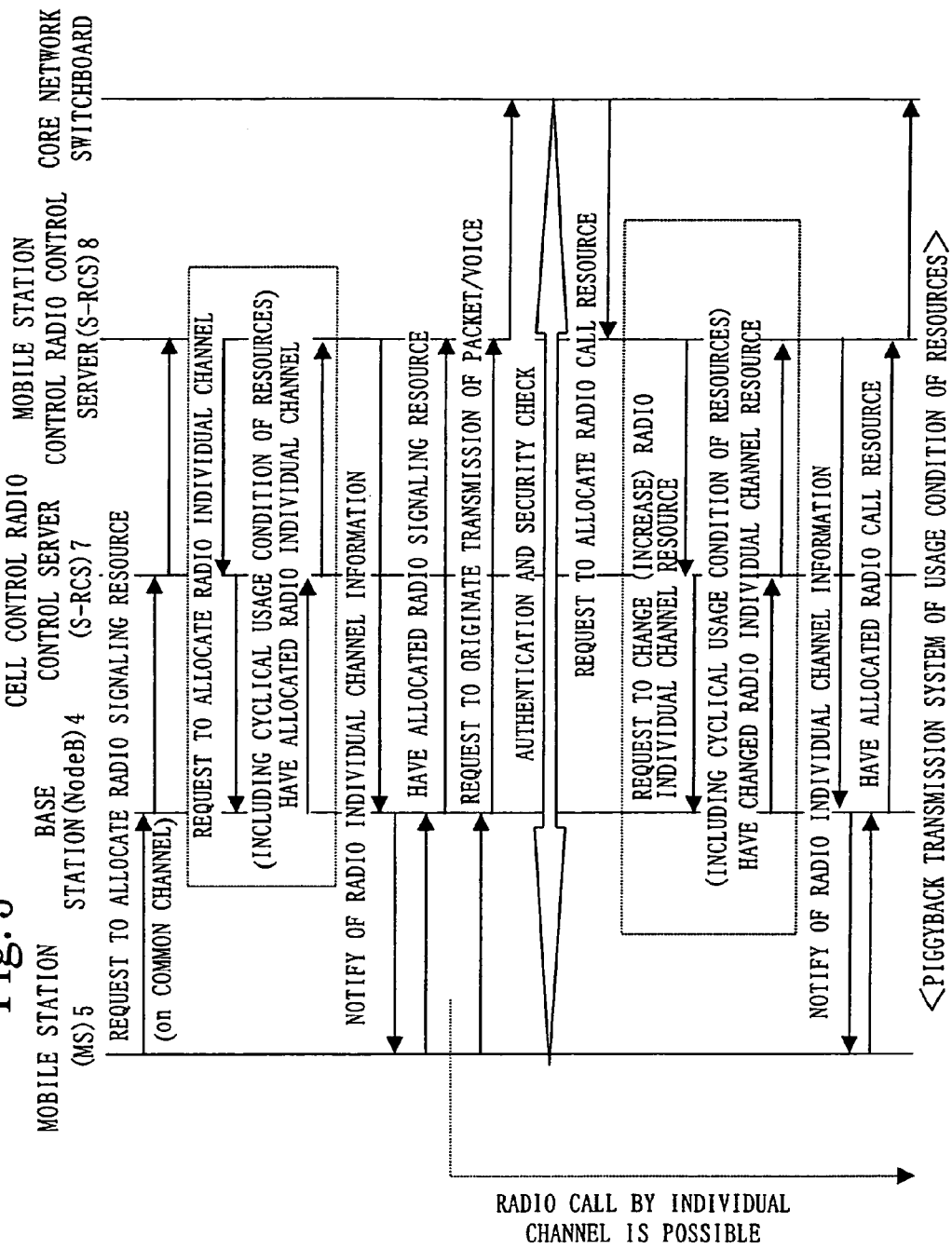
FIG. 3 is a flow of information of radio control when transmission is originated from a station related to Embodiment 2 of this invention.

FIG. 3 is a flow of information in Embodiment 2. In this embodiment, when the mobile station control radio control server (Serving RCS) 8 requests the resources of the radio individual channel from the base station (NodeB) through the cell control radio control server (Cell control RCS) 7, the mobile station control radio control server (Serving RCS) 8 reports the usage condition of the resources to the cell control radio control server (Cell control RCS) 7 at all times. As stated, besides a method of sending the usage condition of the resources together with the request to allocate the radio individual channel, a method of sending it together with the request to change the radio individual channel is effective.

A usage method for the usage condition of the resources, etc. is same as Embodiment 1.

As stated above, in the radio area network (RAN) concerning this embodiment, the notice of the usage condition of the resources from the each of the mobile station control radio control servers (Serving RCS) 8 to the cell control radio control server (Cell control RCS) 7 is sent by piggy-backing on a message to control allocation/change of the radio individual channel, which is always transmitted between the mobile station radio control server (Serving RCS) 8 and the cell control radio control server (Cell control RCS) 7 during operations.

Embodiment 3.

In Embodiment 3, a frequency of reporting the usage condition of the resources to the cell control radio control server (Cell control RCS) 7 by the mobile station control radio control server (Serving RCS) 8 is restricted using a threshold value. For example, in the mobile station control radio control server (Serving RCS) 8, a fixed threshold value x is set for the CPU load, the number of mobile stations (MS) controlled, and the number of buffers used, and only when the concerning usage condition of the resources exceeds this threshold value x for y hour continuously, the usage condition of the resources is reported to the cell control radio control server (Cell control RCS) 7.

A reporting method and a usage method of the usage condition of the resources are same as Embodiment 1 and 2.

As stated above, in the radio area network (RAN) concerning this embodiment, the notice of the usage condition of the resources from each of the mobile station control radio control servers (Serving RCS) 8 to the cell control radio control server (Cell control RCS) 7 is sent only when the usage condition of the resources exceeds the threshold value preconfigured.

Embodiment 4.

Figure 4:
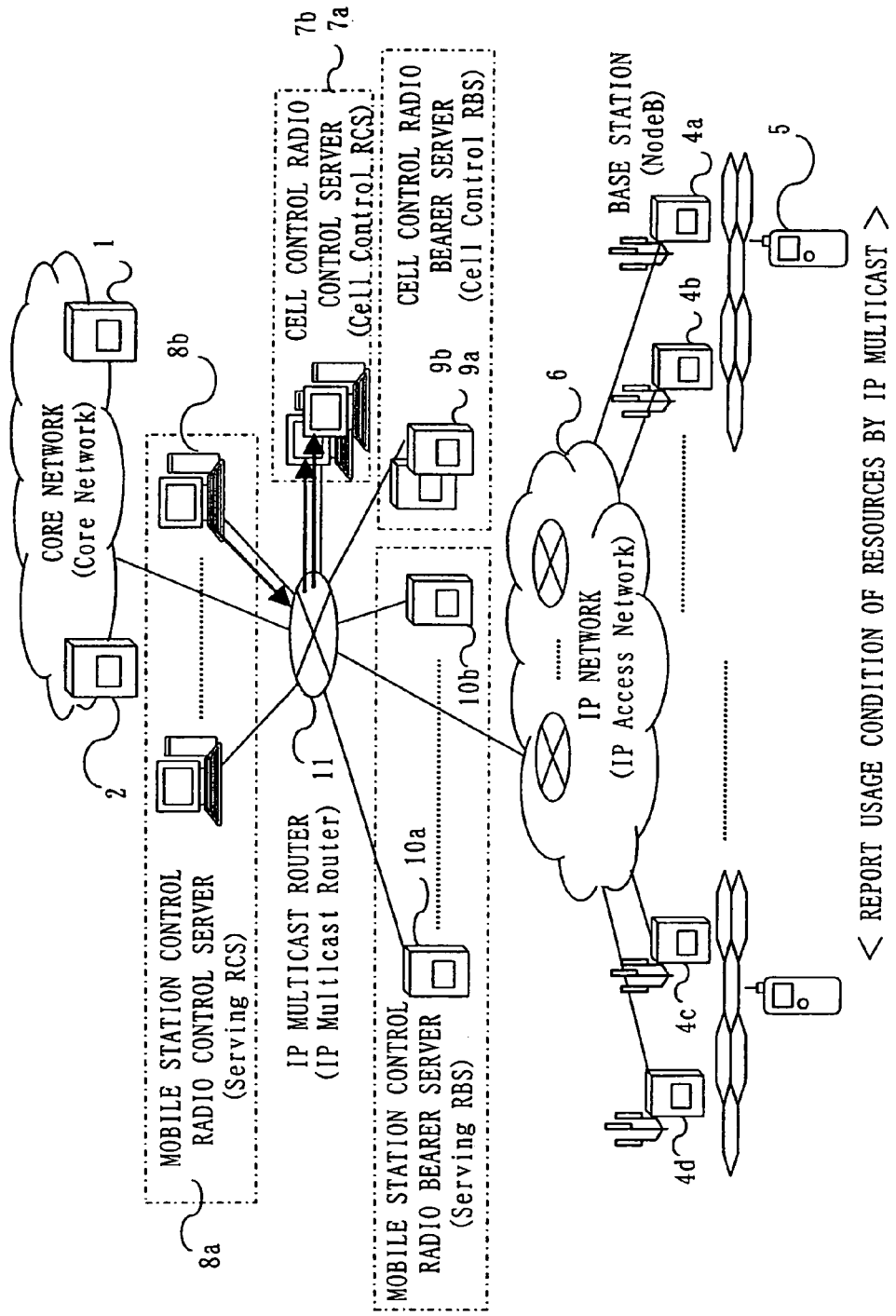
FIG. 4 is a conceptual chart illustrating an operation in radio area network architecture concerning radio control in Embodiment 4 of this invention.

FIG. 4 illustrates radio area network architecture in Embodiment 4. 11 denotes a router with an IP multicast function, belonging to an IP network which functions as a backbone of various equipments in the radio area network (RAN). In FIG. 4, a conceptual flow of the IP multicast is illustrated. The mobile station control radio control server (Serving RCS) 8 sends the usage condition of the resources to a special multicast group. The IP multicast router receives an IP packet addressed to the multicast group, and broadcasts this to the cell control radio control servers (Cell control RCS) 7 which are group members.

As stated above, in the radio area network (RAN) concerning this embodiment, a plurality of cell control radio control servers (Cell control RCS) 7 exists. The cell control radio control servers (Cell control RCS) 7 share the cells to be controlled, and each of the cell control radio control servers (Cell control RCS) 7 communicate with all of the mobile station control radio control servers (Serving RCS) 8 mutually. In this architecture, each of the mobile station control radio control servers (Serving RCS) 8 reports the usage condition of the resources to all of the cell control radio control servers (Cell control RCS) 7 using IP multicast communication.

Embodiment 5.

Figure 5:
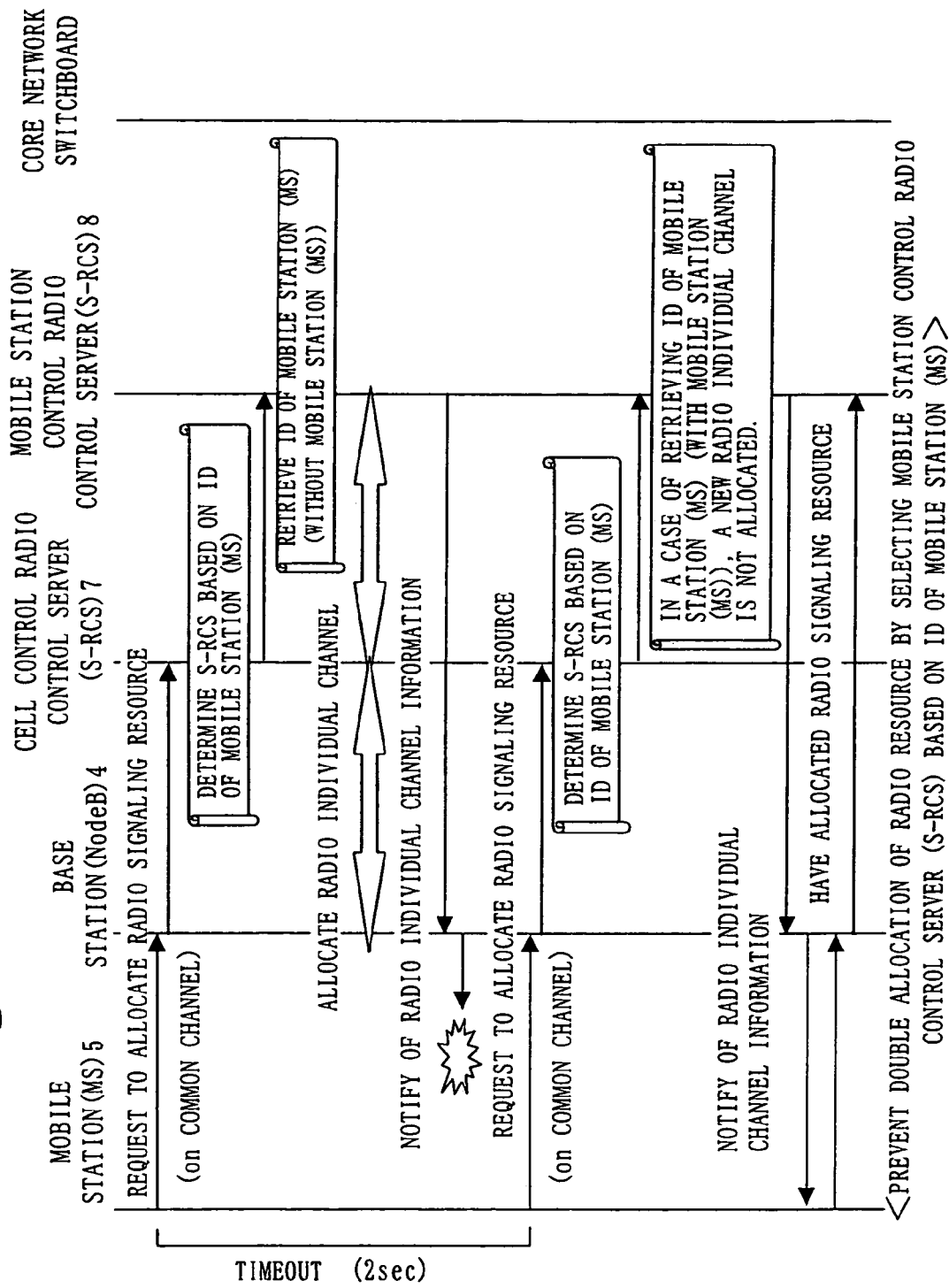
FIG. 5 is a flow of information of radio control when transmission is originated from a station in Embodiment 5 of this invention.

FIG. 5 shows a flow of information in Embodiment 5. When the cell control radio control server (Cell control RCS) 7 receives a request to allocate the radio signaling resources, the cell control radio control server 7 selects a single mobile station control radio control server (Serving RCS) 8 using an ID of the mobile station (MS) 5, e.g., TMSI (Temporary Mobile Subscriber Identity)/P-TMSI (Packet-Temporary Mobile Subscriber Identity)/IMSI (International Mobile Subscriber Identity), etc. included in this request as a key. When a load on this mobile station control radio control server (Serving RCS) 8 is high, it is possible to select a next mobile station control radio control server (Serving RCS) 8. By this selecting method, the request of the same mobile station (MS) 5 to allocate the radio signaling resources is basically transferred to the same mobile station control radio control server (Serving RCS) 8. Since the request to allocate the radio signaling resources and the notice of the radio individual channel information are transmitted on the common channel, there is a high possibility of loss and delay on radio. Therefore, in many cases, the mobile station (MS5) time outs while waiting for the notice of the radio individual channel information, and sends the request to allocate the radio signaling resources again. This time-out time is set for a short time of one to two seconds to prevent the delay in originating transmission. FIG. 5 illustrates this time-out sequence. In this case, the mobile station control radio control server (Serving RCS) 8 which has received a retransmission message of the request to allocate the radio signaling resources judges if the concerning request is being processed or not at present based on the ID of the mobile station (MS) 5. When it is being processed, the notice of the radio individual channel information is retransmitted without obtaining new radio individual channel resources.

When this invention is not relied on and a rule of selecting the mobile station radio control server (Serving RCS) 8 according to this embodiment is not used, there is a case in which the retransmission message of the request to allocate the radio signaling resources is transferred to the mobile station control radio control server (Serving RCS) 8 which is different from the first one. Consequently, the mobile station control radio control server (Serving RCS) 8 which has received the transfer obtains the valuable radio individual channel resources doubly, and these double resources are wasted during time-out to wait for completion of allocation of the radio individual channel.

As stated above, in the radio area network (RAN) concerning this embodiment, when the cell control radio control server (Cell control RCS) 7 receives the request to allocate the radio signaling resources, the cell control radio control server (Cell control RCS) 7 determines the mobile station control radio control server (Serving RCS) 8 using the ID of the mobile station (MS) included in a request message. If the load on this mobile station control radio control server (Serving RCS) 8 is within an acceptable range, the request to allocate the radio signaling resources is transferred to this mobile station control radio control server (Serving RCS) 8. At this time, if the mobile station control radio control server (Serving RCS) 8 has been already processing the request to allocate the radio signaling resources for the ID of the same mobile station (MS) 5, the mobile station control radio control server (Serving RCS) 8 discards the request to allocate the new radio signaling resources to this mobile station (MS) 5.

Embodiment 6.

Generally, control contents in control of the radio area network (RAN) differ according to service provided to the mobile station (MS). For example, in a case of voice communication, the individual channel is always used, and the mobile station (MS) can always communicate using a plurality of cells at once (diversity state). However, in a case of packet communication, when the traffic decreases, the channel is switched to the common channel, and diversity communication state is not reached. As stated, the load of control heavily depends on service. Therefore, the usage condition of the resources, e.g., CPU load, etc. can be predicted from a number of services controlled.

FIG. 6 illustrates an example of calculating a total cost (usage condition of resources) in the mobile station control radio control server (Serving RCS). The mobile station control radio control server (Serving RCS) 8 stores a unit cost for each service type in advance, and calculates the total cost of the mobile station control radio control server (Serving RCS) 8 itself by multiplying this unit cost and a number of mobile stations (MS) providing this service. Then, the mobile station control radio control server (Serving RCS) 8 reports this information as the usage condition of the resources to the cell control radio control server (Cell control RCS) 7.

As stated above, in the radio area network (RAN) concerning this embodiment, the mobile station control radio control server (Serving RCS) 8 calculates a total cost from the number of mobile stations (MS) controlled in a service unit and a known service processing cost, and reports this information as the usage condition of the resources to the cell control radio control server (Cell control RCS) 7.

Embodiment 7.

As an example of a group of the mobile station control radio control servers 8 (Serving RCS) 8, it is presumed that there are two kinds, i.e., the mobile station control radio control servers (Serving RCS) 8 which support double call retrieval (called call retrieval) and the mobile station control radio control servers (Serving RCS) 8 which do not support the call retrieval. Further, the cell control radio control server (Cell control RCS) 7 includes a subscriber user profile using the ID of the mobile station (MS) as the key, and stores subscriber information of whether the subscriber has a contract of the call retrieval. When the cell control radio control server (Cell control RCS) 7 receives the request to allocate the radio signaling resources from the mobile station (MS), the cell control radio control server (Cell control RCS) 7 reads out contract contents of the call retrieval of the subscriber from the ID of the mobiles station (MS) set in the request, and if the call retrieval should be performed, the cell control radio control server (Cell control RCS) 7 transfers the request to allocate the radio signaling resources to the mobile station control radio control server (Serving RCS) 8 which has this function.

Embodiment 8.

There is a possibility that an operator having the cell control radio control server (Cell control RCS) 7 lets this apparatus shared by another operator, and connects the mobile station control radio control server (Serving RCS) 8 owned by the other operator and the said cell control radio control server (Cell control RCS) 7. In this case, the cell control radio control server (Cell control RCS) 7 includes a subscriber user profile using the ID of the mobile station (MS) 5 as the key, and stores a name of the operator whom the subscriber has a contract with as subscriber information. When the cell control radio control server (Cell control RCS) 7 has received the request to allocate the radio signaling resources from the mobile station (MS), the cell control radio control server (Cell control RCS) 7 reads out operator contract contents of the subscriber based on the ID of the mobile station (MS) set in the request, and transfers the request to allocate the radio signaling resources to the mobile station control radio control server (Serving RCS) 8 owned by the concerning operator.

In the above-stated radio area network (RAN), a case in which a function, e.g., dual support, etc. differs in each of the mobile station control radio control servers (Serving RCS) 8 is assumed. In this architecture, when the cell control radio control server (Cell control RCS) 7 receives the request to allocate the radio signaling resources, the cell control radio control server (Cell control RCS) 7 obtains the subscriber information based on the station ID included in the request message. After then, the cell control radio control server (Cell control RCS) 7 selects a single mobile station control radio control server (Serving RCS) among a group of mobile station control radio control servers (Serving RCS) which satisfy a quality of the service contracted by the subscriber, and transfers the request to allocate the radio signaling resources.

Embodiment 9.

Figure 7:
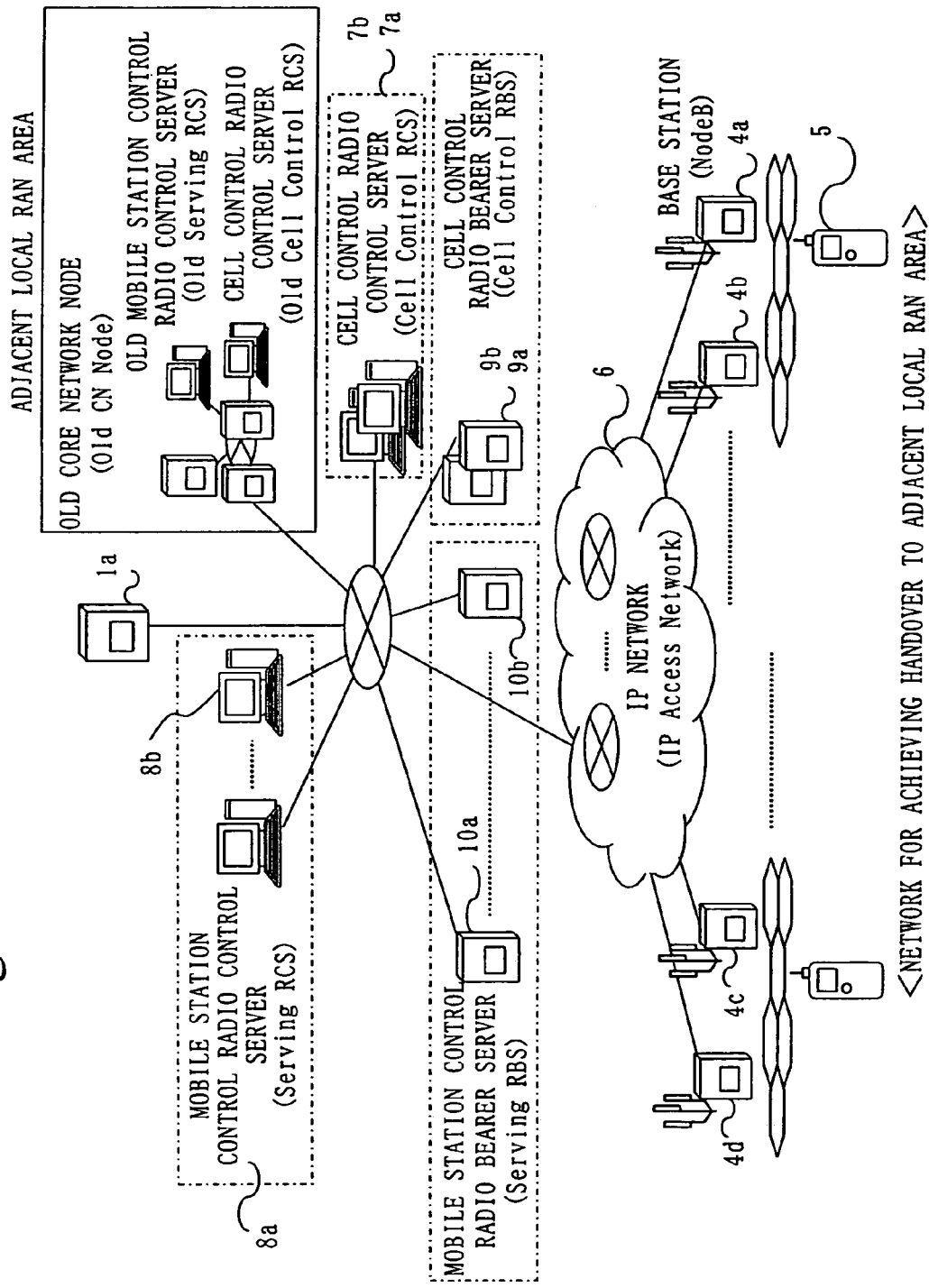
FIG. 7 is radio area network architecture presumed in Embodiment 9 of this invention.

FIG. 7 illustrates radio area network architecture in Embodiment 9. In FIG. 7, a plurality of distributed radio area networks in FIG. 1 is connected through the core network 6, and it is presumed that movement of the mobile station over the radio area network areas is achieved.

Figure 8:
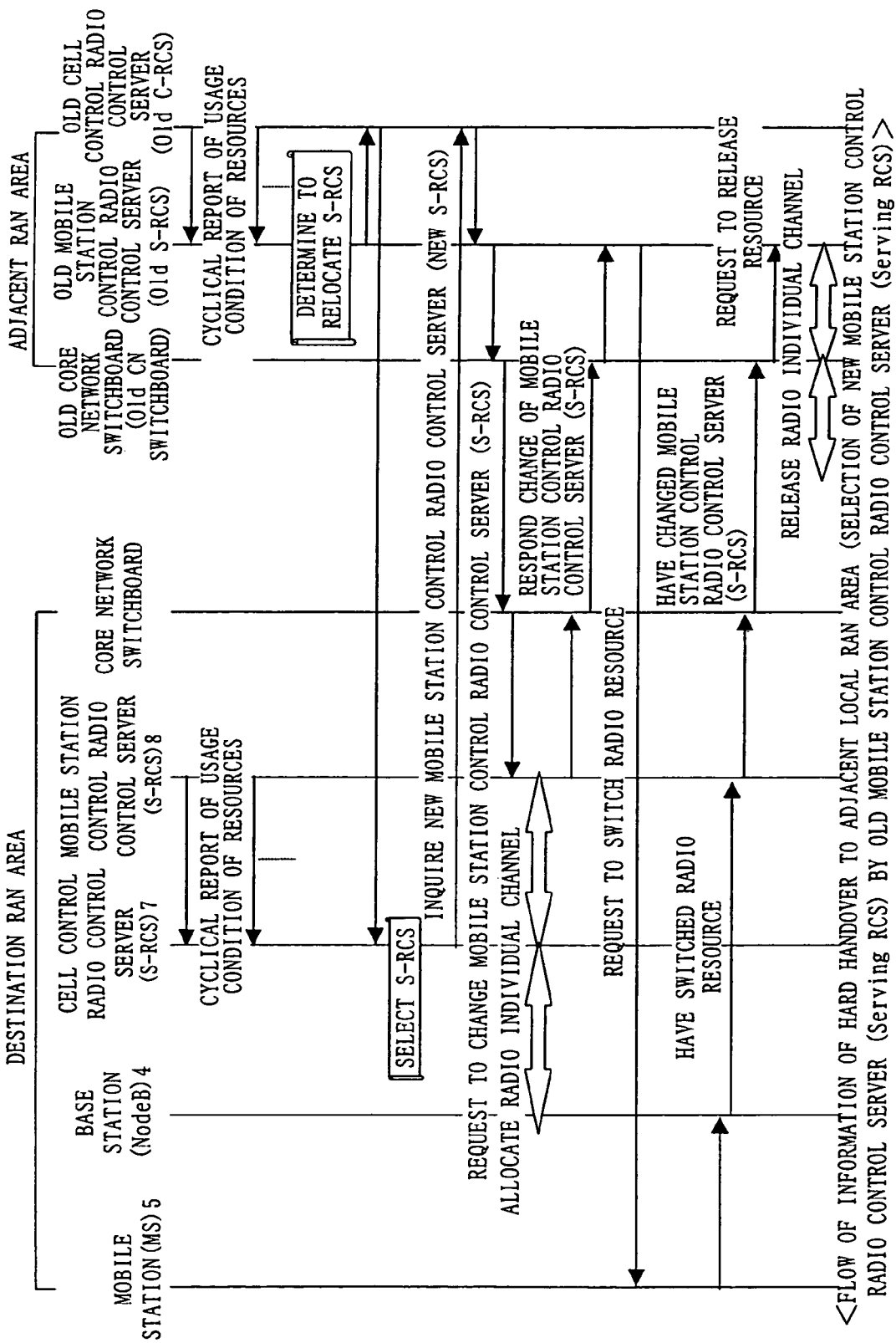
FIG. 8 is a flow of information of radio control when hard handover of station is performed related to Embodiment 9 of this invention.

Next, with reference to FIG. 8, an operation is explained. FIG. 8 illustrates a flow of information in Embodiment 9. Particularly, a flow of information in a case that the mobile station (MS) moves by hard handover from an adjacent radio area network area is illustrated. It is presumed that the cell control radio control server (Cell control RCS) 7 of each of the radio area network areas grasps the usage condition of the resources of all of the mobile station control radio control servers (Serving RCS) 8 belonging to the radio area network area to which the cell control radio control server belongs. When the mobile station (MS) 5 moves, and the mobile station control radio control server (Serving RCS) 8 detects that the mobile station (MS) 5 has moved to an adjacent radio area network area, the mobile station control radio control server (Serving RCS) 8 judges that control of this mobile station (MS) 5 should be committed to the mobile station control radio control server (Serving RCS) 8 belonging to the destination area of movement. In this case, the present mobile station control radio control server (Serving RCS) 8 requests the cell control radio control server (Cell control RCS) 7 in its own area to select a single new mobile station control radio control server (Serving RCS) 8 in the adjacent area. The cell control radio control server (Cell control RCS) 7 requests the cell control radio control server (Cell control RCS) 7 belonging to a destination area of movement to select the mobile station control radio control server (Serving RCS) 8, and its response is returned to the present mobile station control radio control server (Serving RCS) 8. The present mobile station control radio control server (Serving RCS) 8 sends a request to change the mobile station control radio control server (Serving RCS) 8 to commit control to the new mobile station control radio control server (Serving RCS) 8 specified by the obtained response. After this, an operation standardized in 3GPP is performed. The new mobile station control radio control server (Serving RCS) 8 secures the radio individual channel resources according to this request, and the response to change the mobile station control radio control server (Serving RCS) 8 is returned to the present mobile station control radio control server (Serving RCS) 8. After then, the mobile station (MS) changes its own radio resources (frequency and spread code depending on the cell) by sending the request to switch the radio resources to the mobile station (MS) from the present mobile station control radio control server (Serving RCS) 8. After changing the radio resources, the mobile station (MS) 5 comes to be controlled by the new mobile station control radio control server (Serving RCS) 8.

Further, when the present mobile station control server (Serving RCS) 8 requests the new mobile station control radio control server (Serving RCS) 8 in the adjacent area, it is possible to inquire of the cell control radio control server (Cell control RCS) 7 in an origin area of movement directly instead of the cell control radio control server (Cell control RCS) 7 in its own area.

As stated above, this is related to control of the mobile station (MS) 5 when the mobile station (MS) 5 using the radio individual channel moves by hard handover between the local radio area network areas including the cell/base station (NodeB)/RBS/RCS. When the mobile station (MS) 5 moves in this way, the base station (NodeB) 4 (or cell) accommodating the mobile station (MS) 5 becomes out of the control object of the mobile station control radio control server (Serving RCS) 8 which is controlling the mobile station (MS) 5 at present. Therefore, the mobile station control radio control server (Serving RCS) 8 which is controlling the movement of the mobile station (MS) 5 at present commits control of the mobile station (MS) 5 to another mobile station control radio control server (Serving RCS) 8. At the same time, processing of the user traffic of the mobile station (MS) 5 is committed to other mobile station control radio bearer servers (Serving RBS) 10a and 10b.

Further, the cell control radio control server (Cell control RCS) 7 in the local radio area network area includes a mechanism to send information to and receive information from the cell control radio control server (Cell control RCS) 7 set in the adjacent local radio area network area mutually. When the mobile station control radio control server (Serving RCS) 8 has determined to commit control of the mobile station (MS) 5 to one of the mobile station control radio control servers (Serving RCS) 8 in the adjacent local radio area network area, the mobile station control radio control server (Serving RCS) 8 inquires the adjacent local station control radio control server (Serving RCS) 8 which can be used of the cell control radio control server (Cell control RCS) 7 in its own local radio area network area. The cell control radio control server (Cell control RCS) 7 transfers this inquiry to the cell control radio control server (Cell control RCS) 7 in the adjacent local radio area network area, and the cell control radio control server (Cell control RCS) 7 in this adjacent area determines the adjacent mobile station control radio control server (Serving RCS) 8 to be used based on the usage condition of the resources already obtained. This result is returned to the mobile station control radio control server (Serving RCS) 8 which is an origin of the request through the cell control radio control server (Cell control RCS) 7 in its own area. The mobile station control radio control server (Serving RCS) 8 starts a procedure to commit control to the obtained mobile station control radio control server (Serving RCS) 8 in the adjacent area.

Embodiment 10.

Figure 9:
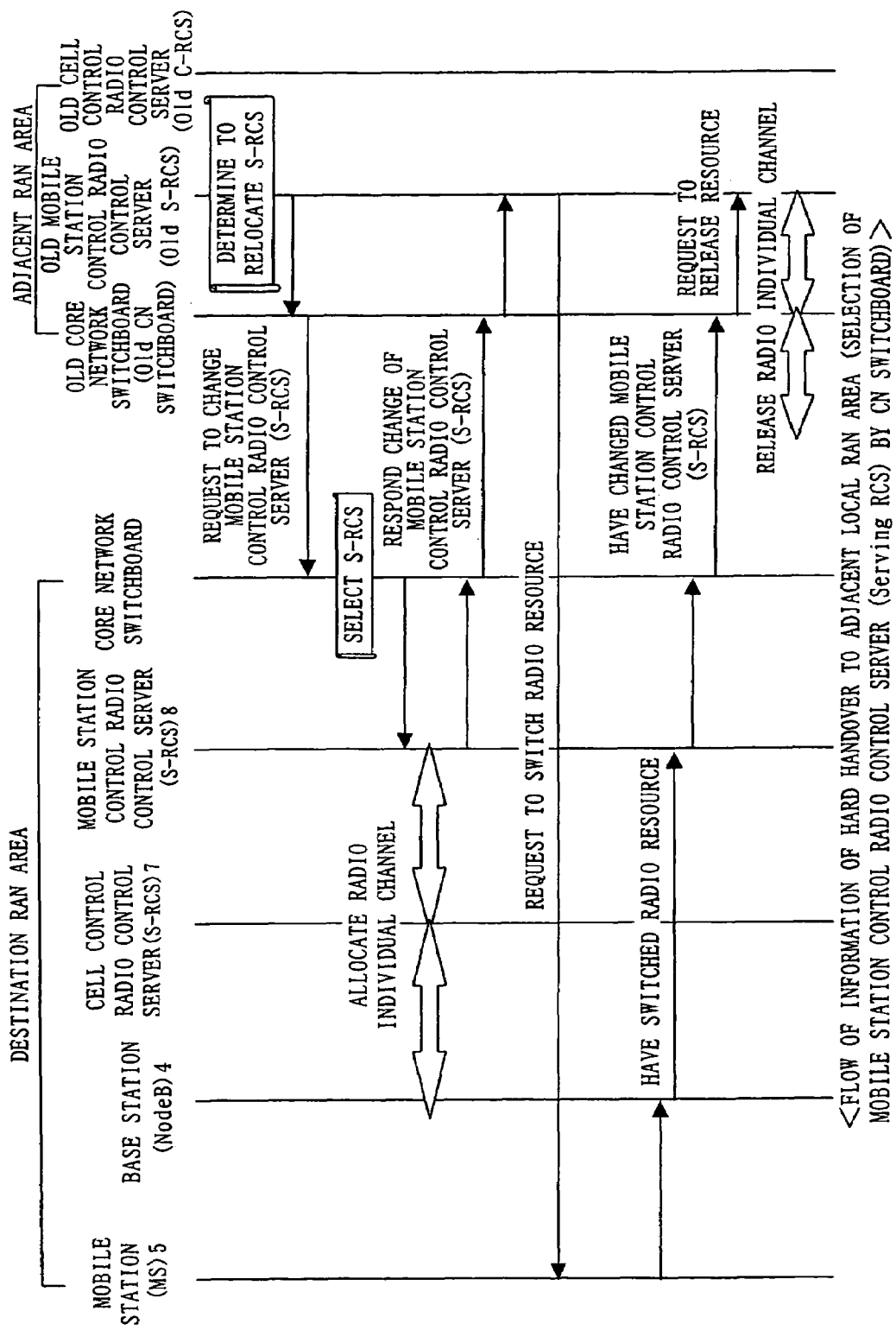
FIG. 9 is a flow of information of radio control when hard handover of station is performed related to Embodiment 10 of this invention.

FIG. 9 illustrates a flow of information in Embodiment 10. It is presumed that the mobile station (MS) moves by hard handover from the adjacent radio area network area using the network of FIG. 7. In a network of this embodiment, a voice/packet switchboard in a core network (CN)

takes a count of a request to originate transmission of voice/packet from the mobile station control radio control server (Serving RCS) 8, and predicts a load on the mobile station control radio control server (Serving RCS) 8. The present mobile station control radio control server (Serving RCS) 8 judges to commit control of the mobile station (MS) 5 to the mobile station control radio control server (Serving RCS) 8 belonging to the destination area of movement, the present mobile station control radio control server (Serving RCS) 8 sends a request to change the mobile station control radio control server (Serving RCS) 8 to the voice/packet switchboard in the core network (CN). At this time, a new mobile station control radio control server (Serving RCS) 8 is not specified yet. The voice/packet switchboard in the destination area of movement selects a single mobile station control radio control server (Serving RCS) 8 by predicting the load on the mobile station control radio control servers (Serving RCS) 8, and transfers the request to change the mobile station control radio control server (Serving RCS) 8 to the selected mobile station control radio control server (Serving RCS) 8. After this, an operation is same as Embodiment 9.

In this example, the voice/packet switchboard in the core network (CN) has predicted the load on the mobile station control radio control server (Serving RCS) 8. However, it is also possible that when the voice/packet switchboard receives the request to change the mobile station control radio control server (Serving RCS) 8, the voice/packet switchboard inquires the mobile station control radio control server (Serving RCS) 8 to be used of the cell control radio control server (Cell control RCS) 7.

As stated above, the switchboard in the core network (CN) includes a mechanism to measure the load on the mobile station control radio control server (Serving RCS) 8 connected by receiving a regular request to originate transmission of the packet/voice from the serving base station controller (Serving RNC) 8 and taking a count of it. When the mobile station (MS) 5 moves between the local radio area network areas and the mobile station control radio control server (Serving RCS) 8 has determined to commit control of the mobile station (MS) 5 to one of the mobile station control radio control servers (Serving RCS) 8 in the adjacent local radio area network area, the mobile station control radio control server (Serivng RCS) 8 requests the mobile station control radio control server (Serving RCS) 8 to commit through a core network (CN) switchboard within its own area—a core network (CN) switchboard within the adjacent area. At this time, the core network (CN) switchboard in the adjacent area determines an optimal mobile station control radio control server (Serving RCS) 8 based on load information on all of the mobile station control radio control servers (Serving RCS) 8 connected, and starts a procedure to commit control to this mobile station control radio control server (Serving RCS) 8.

Embodiment 11.

Figure 10:
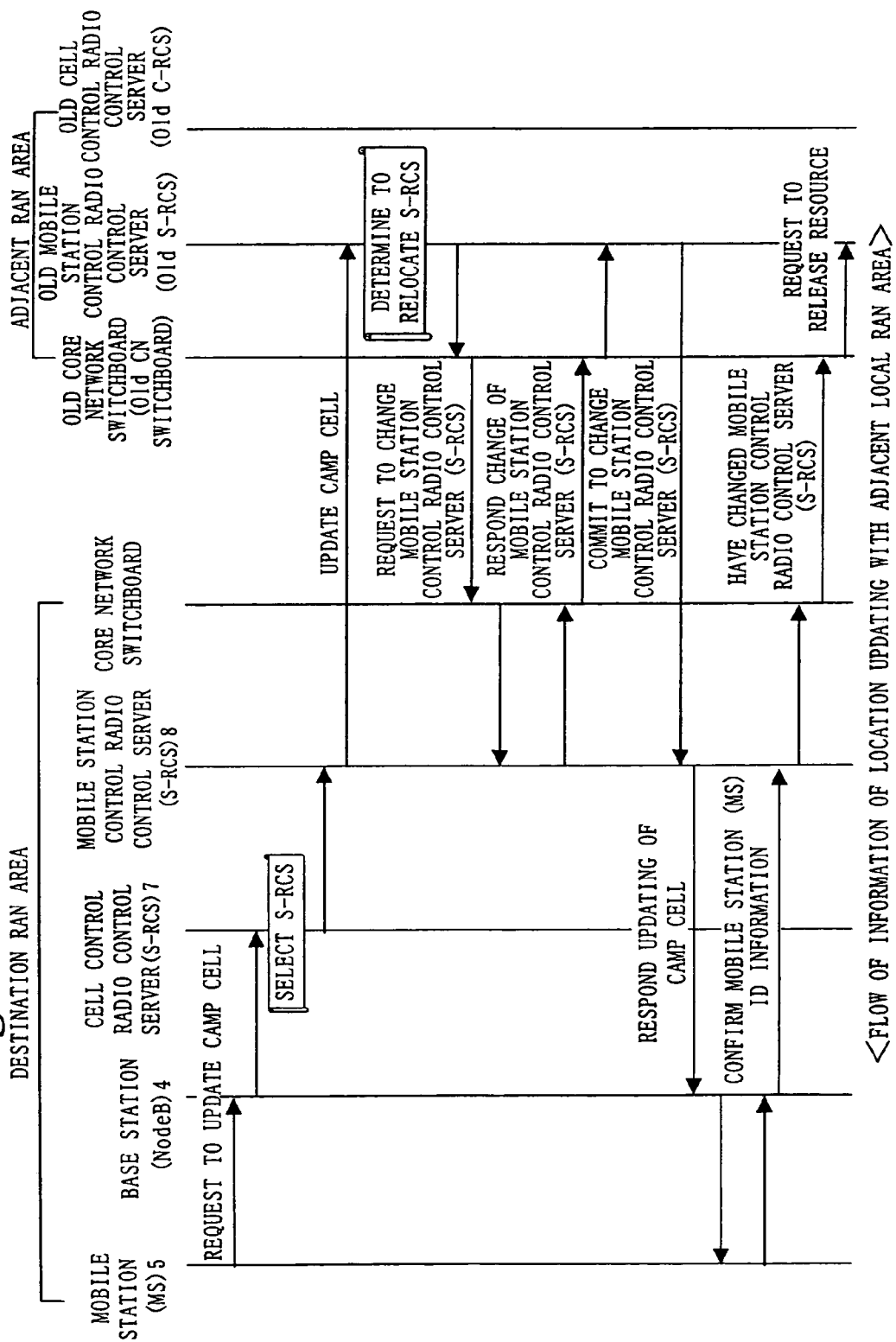
FIG. 10 is a flow of information of radio control when location is updated related to Embodiment 11 of this invention.

FIG. 10 shows a flow of information in Embodiment 11. It is presumed that in a network of FIG. 7, the mobile station (MS) 5 uses a radio common channel, and performs cell updating from an adjacent radio area network area by movement of the mobile station (MS) 5. In this case, the mobile station (MS) 5 camps in a new cell belonging to the adjacent radio area network area, and notifies the network of that. Specifically, the mobile station (MS) 5 sends a request to update a camp cell. This request is received by the cell control radio control server (Cell control RCS) 7 which controls this cell. The cell control radio control server (Cell control RCS) 7 selects the optimal mobile station control radio control server (Serving RCS) 8, and transfers this request to the selected mobile station control radio control server (Serving RCS) 8. When the mobile station control radio control server (Serving RCS) 8 detects that it is not controlling this mobile station (MS) 5, the mobile station control radio control server (Serving RCS) 8 transfers this request to the mobile station control radio control server (Serving RCS) 8 which is controlling the mobile station (MS) 5. The mobile station control radio control server (Serving RCS) 8 in an old area, which has received this message, judges to commit control of the mobile station (MS) to the mobile station control radio control server (Serving RCS) 8 which has sent the message. Then, the old mobile station control radio control server (Serving RCS) 8 sends a request to change the mobile station control radio control server (Serving RCS) 8 to commit control to a new mobile station control radio control server (Serving RCS) 8. After this, the operation standardized in 3GPP is performed. The new mobile station control radio control server (Serving RCS) 8 sets a radio common resource to be used according to this request, and returns a response to change the mobile station control radio control server (Serving RCS) 8 to the present mobile station control radio control server (Serving RCS) 8. The present mobile station control radio control server (Serving RCS) 8 which has received this commits a new mobile station control radio control server (Serving RCS) 8 to control, and the new mobile station control radio control server (Serving RCS) 8 takes over control by sending a response to update the camp cell from the new mobile station control radio control server (Serving RCS) 8 to the mobile station (MS) 5.

This embodiment is related to control of the mobile station (MS) 5 when the mobile station (MS) 5 using the radio common channel moves between the local radio area network areas. When the radio common channel is used for the mobile station (MS) 5, the cell control radio control server (Cell control RCS) 7 within the adjacent area which controls a newly camped cell receives the request to update the cell to camp from the mobile station (MS) 5. This adjacent cell control radio control server (Cell control RCS) 7 determines the adjacent mobile station control radio control server (Serving RCS) 8 to be used based on the usage condition of the resources obtained, and transfers the request to update the cell to this mobile station control radio control server (Serving RCS) 8. The mobile station control radio control server (Serving RCS) 8 judges the mobile station control radio control server (Serving RCS) 8 which is controlling the mobile station (MS) 5 at present based on the information of the request to update the cell, transfers the request to update the cell to this mobile station control radio control server (Serving RCS) 8, and starts the procedure to commit control to the mobile station control radio control server (Serving RCS) 8 in the adjacent area, obtained by the mobile station control radio control server (Serving RCS) 8.

INDUSTRIAL APPLICABILITY

According to this invention, the load on the mobile station control radio control server (Serving RCS) can be distributed evenly by judging the optimal mobile station control radio control server (Serving RCS) based on the usage condition of the resources when the cell control radio control server (Cell Control RCS) receives the request to allocate the radio signaling resources.

According to this invention, the traffic load of notice of the usage condition of the resources can be reduced by piggybacking the notice of the usage condition of the resources from each of the mobile station control radio control servers (Serving RCS) to the cell control radio control server (Cell control RCS) on the message to control allocation/change of the radio individual channel.

According to this invention, the traffic load of notice of the usage condition of the resources can be reduced by limiting the notice of the usage condition of the resources from each of the mobile station control radio control servers (Serving RCS) to the cell control radio control server (Cell control RCS) to a case of exceeding a threshold value which is preconfigured.

According to this invention, the load of transmission of the usage condition of the resources on the cell control radio control server (Serving RCS) can be reduced by IP multicasting the usage condition of the resources from each of the mobile station control radio control servers (Serving RCS) to all of the cell control radio control servers (Cell control RCS).

According to this invention, the cell control radio control server (Cell control RCS) determines the mobile station control radio control server (Serving RCS) using the ID of the mobile station (MS) included in the request message to allocate the radio signaling resources, and if the mobile station control radio control server (Serving RCS) has been already processing the request to allocate the radio signaling resources for the ID of the same mobile station, the mobile station control radio control server (Serving RCS) suppresses meaningless acquisition of the radio resources due to retransmission of the request to allocate the radio signaling resources by discarding the request to allocate the new radio signaling resources to this mobile station (MS).

According to this invention, a potential load can be predicted and the load can be distributed evenly even if a frequency of the notice of the usage condition of the resources is restrained as the mobile station control radio control server (Serving RCS) calculates a total cost from the number of the mobile station (MS) controlled in a service unit and a known service processing cost and determines the mobile station control radio control server (Serving RCS) based on this information.

According to this invention, a various request of users, e.g., call retrieval, dynamic selection of carrier, etc. can be satisfied by differentiating functions of the mobile station control radio control servers (Serving RCS) and selecting the mobile station control radio control server (Serving RCS) according to contract contents of the subscriber.

According to this invention, the load on the mobile station control radio control server (Serving RCS) can be distributed evenly as the mobile station control radio control server (Serving RCS) inquires a mobile station control radio control server (Serving RCS) in an adjacent local radio area network, which can be used, of the cell control radio control server (Cell control RCS) in its own local radio area network and the cell control radio control server (Cell control RCS) transfers this request to the cell control radio control server (Cell control RCS) in the adjacent local radio area network and the cell control radio control server (Cell control RCS) in this adjacent area determines the adjacent mobile station control radio control server (Serving RCS) to be used based on the usage condition of the resources obtained.

According to this invention, the load on the mobile station control radio control server (Serving RCS) can be distributed evenly even in movement between the local radio area networks as the switchboard in the core network (CN) recognizes a load on the mobile station control radio control server (Serving RCS) in its own local radio area network and determines the mobile station control radio control server (Serving RCS) used by the core network (CN) switchboard in the adjacent area.

According to this invention, the load on the mobile station control radio control server (Serving RCS) can be distributed evenly even when the mobile station (MS) uses the radio common channel and moves between the local radio area networks as the (adjacent) cell control radio control server (Cell control RCS) in the adjacent area, which controls the cell in which the mobile station (MS) has newly camped, determines the (adjacent) mobile station control radio control server (Serving RCS) to be used based on the usage condition of the resources obtained.

The invention claimed is:

1. A radio area network control system having a control plane and a bearer plane, comprising:
   a cell control radio control server in said control plane and configured to control cell specific resources;
   a plurality of mobile station control radio control servers in said control plane, each mobile station radio control server configured to perform mobile station control of at least one mobile station, said mobile station control including location management of said at least one mobile station and control of an individual radio channel assigned to said at least one mobile station, each mobile station control radio control server configured to transmit respective mobile station control radio control server resource usage conditions to the cell control radio control server;
   a cell control bearer server in said bearer plane, the cell control bearer server configured to process traffic on a radio common channel based on an instruction from said cell control radio control server; and
   a plurality of mobile station control radio bearer servers in said bearer plane, each mobile station control radio bearer server configured to process traffic on a corresponding radio individual channel based on an instruction from a corresponding one of said plurality of mobile station control radio control servers, wherein
   the cell control radio control server is configured
      to receive the mobile station control radio control server resource usage conditions from the plurality of mobile station control radio control servers,
      to receive from an individual mobile station a request to allocate or change a radio signaling resource,
      to select a mobile station control radio control server to serve said individual mobile station based on the mobile station control radio control server resource usage conditions, and
      to transfer the request to allocate or change a radio signaling resource to the selected mobile station control radio control server.

2. The radio area network control system described in claim 1, wherein each of the plurality of mobile station control radio control servers are configured to cyclically transmit the respective mobile station control radio control server resource usage conditions to the cell control radio control server.

3. The radio area network control system described in claim 1, wherein
   each of said plurality of mobile station control radio control servers is configured to relay the request to allocate or change a radio individual channel to the cell control radio control server.

4. The radio area network control system described in claim 1, wherein
each of said plurality of mobile station control radio control servers is configured to transmit respective mobile station control radio control server resource usage conditions to the cell control radio control server when a corresponding resource usage condition exceeds a determined threshold value.

5. The radio area network control system described in claim 1,
wherein each of said plurality of mobile station control radio control servers is configured to transmit respective mobile station control radio control server resource usage conditions to the cell control radio control server by IP (Internet Protocol).

6. The radio area network control system described in claim 1, wherein
the cell control radio control server is configured to read out a mobile station ID included in the received request to allocate the radio signaling resource, to select the mobile station control radio control server based on both the mobile station ID and the received mobile station control radio control server resource usage condition, and to include the mobile station ID in the transferred request to allocate or change a radio signaling resource, and
the mobile station control radio control server is configured to read the mobile station ID included in the transferred request to allocate or change a radio signaling resource and to discard the request to allocate or change the radio signaling resource when processing the request to allocate or change the radio signaling resource.

7. The radio area network control system described in claim 1, wherein
each of the mobile station control radio control servers is configured to calculate a total cost based on a number of controlled mobile stations, a number of services provided to each controlled mobile station, and a corresponding processing cost for each provided service, and to send the calculated total cost to the cell control radio control server as the corresponding mobile station control radio control server resource usage condition.

8. The radio area network control system described in claim 1, wherein the cell control radio control server is configured to read a mobile station ID included in the received request to allocate a radio signaling resource, to evaluate data from a subscriber contract corresponding to the mobile station ID, and to select the mobile station control radio control server based on the subscriber contract content and the received mobile station control radio control server resource usage conditions.

9. A wide area radio area network control system, comprising:
a first and second radio area network control system, the first radio area network control system configured to control a first radio area and the second radio area network control system configured to control a second radio area adjacent to the first radio control area,
the first radio area network control system comprising:
a first radio area cell control radio control server in a first radio area control plane and configured to control first radio area cell specific resources;
a plurality of first radio area mobile station control radio control servers in said first radio area control plane, each first radio area mobile station radio control server configured to perform first radio area mobile station control of at least one first radio area mobile station, said first radio area mobile station control including location management of said at least one first radio area mobile station and control of a first radio area individual radio channel assigned to said at least one first radio area mobile station, each first radio area mobile station control radio control server configured to transmit respective first radio area mobile station control radio control server resource usage conditions to the first radio area cell control radio control server;
a first radio area cell control bearer server in a first radio area bearer plane, the first radio area cell control bearer server configured to process traffic on a first radio area radio common channel based on an instruction from said first radio area cell control radio control server; and
a plurality of first radio area mobile station control radio bearer servers in said first radio area bearer plane, each first radio area mobile station control radio bearer server configured to process traffic on a corresponding first radio area radio individual channel based on an instruction from a corresponding one of said plurality of first radio area mobile station control radio control servers, wherein the first radio area cell control radio control server is configured to receive the first radio area mobile station control radio control server resource usage conditions from the plurality of first radio area mobile station control radio control servers,
the second radio area network control system comprising:
a second radio area cell control radio control server in a second radio area control plane and configured to control second radio area cell specific resources;
a plurality of second radio area mobile station control radio control servers in said second radio area control plane, each second radio area mobile station radio control server configured to perform second radio area mobile station control of at least one second radio area mobile station, said second radio area mobile station control including location management of said at least one second radio area mobile station and control of a second radio area individual radio channel assigned to said at least one second radio area mobile station, each second radio area mobile station control radio control server configured to transmit respective second radio area mobile station control radio control server resource usage conditions to the second radio area cell control radio control server;
a second radio area cell control bearer server in a second radio area bearer plane, the second radio area cell control bearer server configured to process traffic on a second radio area radio common channel based on an instruction from said second radio area cell control radio control server; and
a plurality of second radio area mobile station control radio bearer servers in said second radio area bearer plane, each second radio area mobile station control radio bearer server configured to process traffic on a corresponding second radio area radio individual channel based on an instruction from a corresponding one of said plurality of second radio area mobile station control radio control servers, wherein the second radio area cell control radio control server is configured to receive the second radio area mobile station control radio control server resource usage conditions from the plurality of second radio area mobile station control radio control servers, wherein one of the plurality of first radio area mobile station control radio control servers is configured to determine that an individual first radio area mobile station will transit from the first radio area to the second radio area, to request one of the plurality of second radio area mobile station control radio control servers be identified for use by the individual first radio area mobile station, and to relay an ID of a selected second area mobile station control radio control server to the individual first radio area mobile station, the request and corresponding ID relayed via the first radio area cell control radio control server and the second radio area cell control radio control server, the ID determined by the second radio area cell control radio control server based on the second radio area mobile station control radio control server resource usage conditions.

10. A wide area radio area network control system, comprising:
a first and second radio area network control system, the first radio area network control system configured to control a first radio area and the second radio area network control system configured to control a second radio area adjacent to the first radio control area,
the first radio area network control system comprising:
a first radio area cell control radio control server in a first radio area control plane and configured to control first radio area cell specific resources;
a plurality of first radio area mobile station control radio control servers in said first radio area control plane, each first radio area mobile station radio control server configured to perform first radio area mobile station control of at least one first radio area mobile station, said first radio area mobile station control including location management of said at least one first radio area mobile station and control of a first radio area individual radio channel assigned to said at least one first radio area mobile station, each first radio area mobile station control radio control server configured to transmit respective first radio area mobile station control radio control server resource usage conditions to the first radio area cell control radio control server;
a first radio area cell control bearer server in a first radio area bearer plane, the first radio area cell control bearer server configured to process traffic on a first radio area radio common channel based on an instruction from said first radio area cell control radio control server; and
a plurality of first radio area mobile station control radio bearer servers in said first radio area bearer plane, each first radio area mobile station control radio bearer server configured to process traffic on a corresponding first radio area radio individual channel based on an instruction from a corresponding one of said plurality of first radio area mobile station control radio control servers, wherein the first radio area cell control radio control server is configured to receive the first radio area mobile station control radio control server resource usage conditions from the plurality of first radio area mobile station control radio control servers, the second radio area network control system comprising:
a second radio area cell control radio control server in a second radio area control plane and configured to control second radio area cell specific resources;
a plurality of second radio area mobile station control radio control servers in said second radio area control plane, each second radio area mobile station radio control server configured to perform second radio area mobile station control of at least one second radio area mobile station, said second radio area mobile station control including location management of said at least one second radio area mobile station and control of a second radio area individual radio channel assigned to said at least one second radio area mobile station, each second radio area mobile station control radio control server configured to transmit respective second radio area mobile station control radio control server resource usage conditions to the second radio area cell control radio control server;
a second radio area cell control bearer server in a second radio area bearer plane, the second radio area cell control bearer server configured to process traffic on a second radio area radio common channel based on an instruction from said second radio area cell control radio control server; and
a plurality of second radio area mobile station control radio bearer servers in said second radio area bearer plane, each second radio area mobile station control radio bearer server configured to process traffic on a corresponding second radio area radio individual channel based on an instruction from a corresponding one of said plurality of second radio area mobile station control radio control servers, wherein the second radio area cell control radio control server is configured to receive the second radio area mobile station control radio control server resource usage conditions from the plurality of second radio area mobile station control radio control servers, the wide area radio area network control system further comprising:
a switchboard belonging to a core network, the switchboard configured to count a number of requests to originate a packet or voice transmission from each mobile station control radio control servers in the first and second radio area network control systems, and to measure a load on each mobile station control radio control servers in the first and second radio area network control systems based on the number, wherein
one of the plurality of first radio area mobile station control radio control servers is configured to determine that an individual first radio area mobile station will transit from the first radio area to the second radio area, to request the switchboard identify one of the plurality of second radio area mobile station control radio control servers for use by the individual first radio area mobile station, and to relay an ID of a selected second area mobile station control radio control server received from the switchboard to the individual first radio area mobile station, the request and corresponding ID relayed via the first radio area cell control radio control server and the second radio area cell control radio control server, the ID determined by the switchboard based on the load measured by the switchboard.

11. A radio area network control system having a control plane and a bearer plane, comprising:
a cell control radio control server in said control plane and configured to control cell specific resources;
a plurality of mobile station control radio control servers in said control plane, each mobile station radio control server configured to perform mobile station control of at least one mobile station, said mobile station control including location management of said at least one mobile station and control of an individual radio channel assigned to said at least one mobile station, each mobile station control radio control server configured to transmit respective mobile station control radio control server resource usage conditions to the cell control radio control server;

a cell control bearer server in said bearer plane, the cell control bearer server configured to process traffic on said radio common channel based on an instruction from said cell control radio control server; and a plurality of mobile station control radio bearer servers in said bearer plane, each mobile station control radio bearer server configured to process traffic on a corresponding radio individual channel based on an instruction from a corresponding one of said plurality of mobile station control radio control servers, wherein the cell control radio control server is configured to receive the mobile station control radio control server resource usage conditions from the plurality of mobile station control radio control servers, to receive a request to change a camp cell from an individual mobile station via the radio common channel, to select a mobile station control radio control server to serve as a new camp cell for said individual mobile station based on the mobile station control radio control server resource usage conditions, and to transfer the request to change the camp cell to a currently assigned mobile station control radio control server via the selected mobile station control radio control server.

12. A method of communicating via a radio area network control system having a control plane and a bearer plane, the radio area network control system including a cell control radio control server and a plurality of mobile station control radio control servers in said control plane, and a cell control bearer server and a plurality of mobile station control radio bearer servers in said bearer plane, comprising:

controlling cell specific resources with said cell control radio control server;

performing mobile station control of at least one mobile station by one of said plurality of mobile station control radio control servers, said mobile station control including location management of said at least one mobile station and control of an individual radio channel assigned to said at least one mobile station;

transmitting respective mobile station control radio control server resource usage conditions from the one of said plurality of mobile station control radio control servers to the cell control radio control server;

processing traffic on a radio common channel by the cell control bearer server based on an instruction from said cell control radio control server;

processing traffic on a corresponding radio individual channel by one of said plurality of mobile station control radio bearer servers based on an instruction from a corresponding one of said plurality of mobile station control radio control servers;

receiving at the cell control radio control server the mobile station control radio control server resource usage conditions from the plurality of mobile station control radio control servers;

receiving at the cell control radio control server a request to allocate or change a radio signaling resource from an individual mobile station;

selecting by the cell control radio control server a mobile station control radio control server to serve said individual mobile station based on the mobile station control radio control server resource usage conditions; and transferring by the cell control radio control server the request to allocate or change a radio signaling resource to the selected mobile station control radio control server.

13. The method described in claim 12, wherein the step of transmitting respective mobile station control radio control server resource usage conditions comprises:

cyclically transmitting said respective mobile station control radio control server resource usage conditions.

14. The method described in claim 12, further comprising relaying by an assigned mobile station control radio control server the request to allocate or change a radio individual channel to the cell control radio control server.

15. The method described in claim 12, wherein the step of transmitting respective mobile station control radio control server resource usage conditions comprises:

transmitting said respective mobile station control radio control server resource usage conditions when a corresponding resource usage condition exceeds a determined threshold value.

16. The method described in claim 12, wherein the step of transmitting respective mobile station control radio control server resource usage conditions comprises:

transmitting by IP (Internet Protocol).

17. The method described in claim 12, further comprising:

reading out by the cell control radio control server a mobile station ID included in the received request to allocate the radio signaling resource;

selecting the mobile station control radio control server based on both the mobile station ID and the received mobile station control radio control server resource usage condition;

including the mobile station ID in the transferred request to allocate or change a radio signaling resource;

reading by the mobile station control radio control server the mobile station ID included in the transferred request to allocate or change a radio signaling resource; and discarding at the mobile station control radio control server the request to allocate or change the radio signaling resource when processing the request to allocate or change the radio signaling resource.

18. The method described in claim 12, further comprising:

calculating by the mobile station control radio control server a total cost based on a number of controlled mobile stations, a number of services provided to each controlled mobile station, and a corresponding processing cost for each provided service; and sending the calculated total cost to the cell control radio control server as the corresponding mobile station control radio control server resource usage condition in said transmitting step.

19. The method described in claim 12, further comprising:

reading by the cell control radio control server a mobile station ID included in the received request to allocate a radio signaling resource;

evaluating data from a subscriber contract corresponding to the mobile station ID; and selecting the mobile station control radio control server based on the subscriber contract content and the received mobile station control radio control server resource usage conditions.

20. A method of communicating in a wide area radio area network control system, including a first radio area network control system configured to control a first radio area and a second radio area network control system configured to control a second radio area adjacent to the first radio area, the first radio area network control system including a first radio area cell control radio control server and a plurality of first radio area mobile station control radio control servers in a first radio area control plane, and a first radio area cell control bearer server and a plurality of first radio area mobile station control radio bearer servers in a first radio area bearer plane, the second radio area network control system including a second radio area cell control radio control server and a plurality of second radio area mobile station control radio control servers in a second radio area control plane, and a second radio area cell control bearer server and a plurality of second radio area mobile station control radio bearer servers in a second radio area bearer plane, comprising:

controlling first radio area cell specific resources with the first radio area cell control radio control server;

controlling second radio area cell specific resources with the second radio area cell control radio control server;

transmitting respective first radio area mobile station control radio control server resource usage conditions from the one of said plurality of first radio area mobile station control radio control servers to the first radio area cell control radio control server;

transmitting respective second radio area mobile station control radio control server resource usage conditions from the one of said plurality of second radio area mobile station control radio control servers to the second radio area cell control radio control server;

determining by one of the plurality of first radio area mobile station control radio control servers that a mobile station will transit to from the first radio area to the second radio area;

sending a request from the one of the plurality of first radio area mobile station control radio control servers to identify one of said plurality of second radio area mobile station control radio control servers as an adjacent area mobile station control radio control server for use by the first radio area mobile station after transiting to the second radio area; and relaying an adjacent area mobile station control radio control server ID to the mobile station, the request and corresponding ID relayed via the first radio area cell control radio control server and the second radio area cell control radio control server.

21. A method of communicating in a wide area radio area network control system, including a switchboard, a first radio area network control system configured to control a first radio area and a second radio area network control system configured to control a second radio area adjacent to the first radio area, the first radio area network control system including a first radio area cell control radio control server and a plurality of first radio area mobile station control radio control servers in a first radio area control plane, and a first radio area cell control bearer server and a plurality of first radio area mobile station control radio bearer servers in a first radio area bearer plane, the second radio area network control system including a second radio area cell control radio control server and a plurality of second radio area mobile station control radio control servers in a second radio area control plane, and a second radio area cell control bearer server and a plurality of second radio area mobile station control radio bearer servers in a second radio area bearer plane, comprising:

controlling first radio area cell specific resources with the first radio area cell control radio control server;

controlling second radio area cell specific resources with the second radio area cell control radio control server;

transmitting respective first radio area mobile station control radio control server resource usage conditions from the one of said plurality of first radio area mobile station control radio control servers to the first radio area cell control radio control server;

transmitting respective second radio area mobile station control radio control server resource usage conditions from the one of said plurality of second radio area mobile station control radio control servers to the second radio area cell control radio control server;

counting by the switchboard a number of requests to originate a packet or voice transmission from each first radio area mobile station control radio control server and each second radio area mobile station control radio control server;

determining by one of the plurality of first radio area mobile station control radio control servers that a mobile station will transit from the first radio area to the second radio area;

sending a request from the one of the plurality of first radio area mobile station control of radio control servers to identify one of said plurality of second radio area mobile station control radio control servers as an adjacent area mobile station control radio control server for use by the first radio area mobile station after transiting to the second radio area; and relaying an adjacent area mobile station control radio control server ID to the transiting mobile station, the request and corresponding ID relayed via the first radio area cell control radio control server and the second radio area cell control radio control server.

22. A method of communicating via a radio area network control system having a control plane and a bearer plane, the radio area network control system including a cell control radio control server and a plurality of mobile station control radio control servers in said control plane, and a cell control bearer server and a plurality of mobile station control radio bearer servers in said bearer plane, comprising:

controlling cell specific resources with said cell control radio control server;

performing mobile station control of at least one mobile station by one of said plurality of mobile station control radio control servers, said mobile station control including location management of said at least one mobile station and control of an individual radio channel assigned to said at least one mobile station;

transmitting respective mobile station control radio control server resource usage conditions from the one of said plurality of mobile station control radio control servers to the cell control radio control server;

processing traffic on a radio common channel by the cell control bearer server based on an instruction from said cell control radio control server;

processing traffic on a corresponding radio individual channel by one of said plurality of mobile station control radio bearer servers based on an instruction from a corresponding one of said plurality of mobile station control radio control servers;

receiving at the cell control radio control server the mobile station control radio control server resource usage conditions from the plurality of mobile station control radio control servers;

receiving at the cell control radio control server a request to change a camp cell from an individual mobile station;

selecting by the cell control radio control server a mobile station control radio control server to serve said individual mobile station as said camp cell based on the mobile station control radio control server resource usage conditions; and transferring by the cell control radio control server the request to change the camp cell to a currently assigned mobile station control radio control server via the selected mobile station control radio control server.

* * * * *